US006973417B1

(12) United States Patent
Maxwell, III et al.

(10) Patent No.: US 6,973,417 B1
(45) Date of Patent: Dec. 6, 2005

(54) METHOD AND SYSTEM FOR SIMULATING EXECUTION OF A TARGET PROGRAM IN A SIMULATED TARGET SYSTEM

(75) Inventors: Sidney Richards Maxwell, III, Bothell, WA (US); Michael Louis Steinberger, Woodinville, WA (US)

(73) Assignee: Metrowerks Corporation, Austin, TX (US)

( * ) Notice: Subject to any disclaimer, the term of this patent is extended or adjusted under 35 U.S.C. 154(b) by 0 days.

(21) Appl. No.: 09/435,003

(22) Filed: Nov. 5, 1999

(51) Int. Cl.[7] .................. G06F 17/00; G06F 11/00; G06F 15/00; G06F 15/76; G06F 9/44
(52) U.S. Cl. .............. 703/2; 703/13; 703/14; 703/15; 703/16; 714/38; 712/34; 717/135
(58) Field of Search .............. 703/13–17, 20, 703/27, 2; 714/38; 712/34; 717/135

(56) References Cited

U.S. PATENT DOCUMENTS

| | | | |
|---|---|---|---|
| 4,445,192 A | 4/1984 | Haag et al. ............... 364/900 |
| 4,622,652 A | 11/1986 | Zumchak et al. ........... 364/900 |
| 4,819,233 A | 4/1989 | Delucia et al. ............ 371/19 |
| 4,845,615 A | 7/1989 | Blasciak .................. 364/200 |
| 4,937,740 A | 6/1990 | Agarwal et al. ........... 364/200 |
| 5,047,919 A | 9/1991 | Sterling et al. ........... 364/200 |
| 5,062,055 A | 10/1991 | Chinnaswamy et al. ...... 364/513 |
| 5,103,394 A | 4/1992 | Blasciak .................. 395/575 |
| 5,121,489 A | 6/1992 | Andrews .................. 395/375 |
| 5,121,501 A | 6/1992 | Baumgartner et al. ...... 395/800 |
| 5,134,701 A | 7/1992 | Mueller et al. ........... 395/500 |
| 5,136,590 A | 8/1992 | Polstra et al. ........... 371/16.2 |
| 5,165,026 A * | 11/1992 | Kusakabe ................. 700/3 |
| 5,228,039 A | 7/1993 | Knoke et al. ............. 371/19 |

(Continued)

FOREIGN PATENT DOCUMENTS

EP    0 767 430 A2    4/1997

(Continued)

OTHER PUBLICATIONS

Suzuki, et al. "Efficient Software Performance Estimation Methods for Hardware / Software Codesign". 33rd Design Automation Conference Proceedings, 1996.*

(Continued)

*Primary Examiner*—Kevin J. Teska
*Assistant Examiner*—Ayal Sharon
(74) *Attorney, Agent, or Firm*—Andrews Kurth LLP; J. Scott Denko

(57) ABSTRACT

A method and system for simulating the execution of a software program on a simulated hardware system. An instrumented software program is divided into program segments delineated by tags and is then analyzed for data describing the program segments. The data is tabulated and indexed in a function data table according to the program segments. Hardware parameters that at least define a portion of the simulated hardware system are tabulated in a hardware configuration file. The software program is executed on a host system, and when a tag is executed, data indexed in the function data table under the program segment corresponding to the executed tag and hardware parameters tabulated in the hardware configuration file are used to calculate an estimated execution time for the program segment corresponding to the executed tag. The estimated execution time for the program segment is added to a running total for the overall execution time of the software program. The system includes a memory for storing software parameters describing program segments of the software program, and for storing hardware parameters that at least partially define the simulated hardware system. The system further includes a processor for calculating an estimated execution time for the software program using the software and hardware parameters.

36 Claims, 9 Drawing Sheets

U.S. PATENT DOCUMENTS

| | | | |
|---|---|---|---|
| 5,265,254 A | 11/1993 | Blasciak et al. | 395/700 |
| 5,307,498 A | 4/1994 | Eisen et al. | 395/700 |
| 5,321,828 A | 6/1994 | Phillips et al. | 395/500 |
| 5,329,471 A | 7/1994 | Swoboda et al. | 364/578 |
| 5,355,369 A | 10/1994 | Greenberger et al. | 371/22.3 |
| 5,361,351 A | 11/1994 | Lenkov et al. | 395/700 |
| 5,371,878 A | 12/1994 | Coker | 395/500 |
| 5,375,125 A | 12/1994 | Oshima et al. | 371/19 |
| 5,408,650 A | 4/1995 | Arsenault | 395/575 |
| 5,410,685 A | 4/1995 | Banda et al. | 395/575 |
| 5,450,586 A | 9/1995 | Kuzara et al. | 395/700 |
| 5,488,713 A | 1/1996 | Norton et al. | 395/500 |
| 5,522,036 A | 5/1996 | Shapiro | 395/183.14 |
| 5,533,192 A | 7/1996 | Hawley et al. | 395/183.04 |
| 5,539,907 A | 7/1996 | Srivastava et al. | 395/700 |
| 5,581,695 A | 12/1996 | Knoke et al. | 395/183.04 |
| 5,613,098 A * | 3/1997 | Landau et al. | 703/20 |
| 5,615,332 A | 3/1997 | Yamamoto | 395/183.14 |
| 5,678,028 A * | 10/1997 | Bershteyn et al. | 703/22 |
| 5,737,520 A | 4/1998 | Gronlund et al. | 395/183.15 |
| 5,748,878 A | 5/1998 | Rees et al. | 395/183.14 |
| 5,771,345 A | 6/1998 | Tallman et al. | 395/183.06 |
| 5,838,948 A * | 11/1998 | Bunza | 703/27 |
| 5,857,093 A | 1/1999 | Bradford | 395/500 |
| 5,903,759 A | 5/1999 | Sun et al. | 395/704 |
| 5,911,059 A * | 6/1999 | Profit, Jr. | 703/20 |
| 5,956,512 A | 9/1999 | Simmons et al. | 395/705 |
| 5,987,243 A * | 11/1999 | Aihara | 703/17 |
| 5,999,734 A * | 12/1999 | Willis et al. | 717/149 |
| 6,016,557 A | 1/2000 | Kasprzyk et al. | 714/38 |
| 6,047,390 A | 4/2000 | Butt et al. | 714/43 |
| 6,052,524 A * | 4/2000 | Pauna | 703/22 |
| 6,094,730 A | 7/2000 | Lopez et al. | 714/28 |
| 6,106,571 A | 8/2000 | Maxwell | 717/131 |
| 6,110,220 A * | 8/2000 | Dave et al. | 716/3 |
| 6,161,200 A * | 12/2000 | Rees et al. | 714/38 |
| 6,178,542 B1 * | 1/2001 | Dave | 716/18 |
| 6,202,044 B1 * | 3/2001 | Tzori | 703/28 |
| 6,223,144 B1 * | 4/2001 | Barnett et al. | 703/22 |
| 6,230,114 B1 * | 5/2001 | Hellestrand et al. | 703/13 |
| 6,263,302 B1 * | 7/2001 | Hellestrand et al. | 703/17 |
| 6,298,320 B1 * | 10/2001 | Buckmaster et al. | 703/19 |
| 6,311,327 B1 * | 10/2001 | O'Brien et al. | 714/35 |
| 6,381,656 B1 | 4/2002 | Shankman | 710/18 |
| 2001/0041974 A1 | 11/2001 | Buckmaster et al. | 703/28 |
| 2002/0073398 A1 | 6/2002 | Tinker | 717/110 |
| 2002/0095660 A1 | 7/2002 | O'Brien et al. | 717/127 |

FOREIGN PATENT DOCUMENTS

| | | |
|---|---|---|
| EP | 1 130 518 A1 | 9/2001 |
| WO | WO 00/43886 | 7/2000 |

OTHER PUBLICATIONS

Hollenbeck, D. "Performance" Slides, The Univ. of Texas at Dallas, Erik Jonsson School of Engineering and Computer Science. Jan 1998.*

Liu, J. et al. "Software timing analysis using HW/SW co-simulation and instruction set simulator" Proc. of 6th Int'l Workshop on HW/SW Co-design. 1998. pp. 65-69.*

Hines, K. et al. "Dynamic Communication Models in Embedded System Co-simulation" Proc. 34$^{th}$ Annual Conf. on DAC. 1997. pp. 395-400.*

Liu, H. "Integrated partitioning and scheduling for Hardware / Software co-design" Proc. Int'l Conf. on Comp. Design: VLSI in Computers and Processors (ICCD '98). Oct. 5-7, 1998. pp. 609-614.*

Li, Y. "Hardware / Software co-synthesis with memory hierarchies" 1998 IEEE/ACM Int'l Conf. on CAD. (ICCAD '98). Nov. 8-12, 1998. pp. 430-436.*

Dave, B. "COSYN: Hardware-Software Co-synthesis of Embedded Systems" Proc. of 34$^{th}$ Annual Conf. on DAC. 1997. pp. 703-708.*

Mowry et al. "Design and Evalutation of a Compiler Algorithm for Prefetching". Proc. 5$^{th}$ Int'l COnf. on Arch. SUpport for Programming Languages and Operating Systems. 1992. pp. 62-73.*

Sorin et al. "Analytic Evaluation of Shared-Memory Systems with ILP Processors" Proc. of 25$^{th}$ Annual Int'l Symposium on Computer Arch. 1998. pp. 380-391.*

Devadas, S. et al. "An Observability-Based Code Coverage Metric for Functional Simulation". Proc. of the 1996 IEEE/ACM on Computer Aided Design.1997. pp. 418-425.*

Gajski, Daniel D., *Specification and Design of Embedded Systems*, Prentice-Hall, New Jersey, 1994, Chap. 7 "Design Quality Estimation," pp. 290-304.

Bourdoncle, F., "Abstract Debugging of Higher-Order Imperative Languages," ACM SIGPLAN PLDI, pp. 46-55, Apr. 1993.

Crooks, Roger "Embedded RISC μPs Present New Debugging Challenges," *EDN*, 39(16):105-112, Aug. 4, 1994.

Fritzson, P. et al., "Generalized Algorithmic Debugging and Testing," ACM SIGPLAN PLDI, pp. 317-326, Jul. 1991.

Liao, Y. et al., "A Specificational Approach to High Level Program Monitoring and Measuring," *IEEE Transactions on Software Engineering*, 18(11):969-978, Nov. 1992.

Potkonjak, M. et al., "Design-For-Debugging of Application Specific Designs," *Pro. Of IEEE/ACM Int. Conf. CAD*, pp. 295-301, Nov. 1995.

Wahbe, R. et al., "Practical Data Breakpoints: Design and Implementation," ACM SIGPLAN PLDI, pp. 1-12, Apr. 1993.

Wahl, N. et al., "A Paradigm for Distributed Debugging," *ACM*, pp. 235-242, Apr. 1992.

Yan, J., "Performance Tuning with AIMS—An Automated Instrumentation and Monitoring System for Multicomputers," *Annual Hawaii Int'l. Conf. on System Sciences*, pp. 625-633, 1994.

* cited by examiner

METHOD AND SYSTEM FOR SIMULATING EXECUTION OF A TARGET PROGRAM IN A SIMULATED TARGET SYSTEM

TECHNICAL FIELD

The present invention relates generally to testing and developing the software and hardware of embedded systems, and more specifically, to a system and method for simulating the execution of software in a simulated hardware environment.

BACKGROUND OF THE INVENTION

With the advent of 32-bit microprocessors and complex operating software, embedded systems have become very complex systems. An embedded system is a system whose primary purpose is to perform a specific function rather than to perform general computational functions. A microprocessor-based microwave oven controller, a microprocessor-based automobile ignition system, and a microprocessor-based telephone switching system are all examples of embedded systems. An embedded system typically includes a microprocessor, which executes a stored software program and interacts with an application specific integrated circuit (ASIC) or a custom Integrated Circuit (IC). The microprocessor used in the system is designated herein as a target processor. The external circuitry that interacts with the target processor, whether it is the ASIC, custom IC, or some other form of electronic circuitry, is designated herein as the target circuitry. The combination of the target circuitry and the target processor is designated herein as the target hardware. The software program that is intended to be executed by the target processor is designated herein as the target program.

Given the complexity and density of modern electronics designs, it is desirable that the first system prototype, including the target hardware and the target program, is close in form, fit, and function to the end product. However, when a program developer begins work on the target program, the physical target hardware which will ultimately execute the target program is usually under development and does not exist. Consequently, the hardware and software components of a target system design are typically brought together for the first time when the prototype target hardware has been fabricated. Because of the prior unavailability of the actual target hardware, one often finds that the target program loaded at the time of the integration of the prototype target hardware and software does not work. It is common to find that the integration problems are strictly due to software complications alone. This may cause significant delays in the software development due to the problems in the target program. Other problems with the integration may be caused by the interaction of the target hardware with the target program. Consequently, considering the large cost of ASIC and custom IC design, and the relatively low cost ease of software modification, it is common that the software will be force-fitted to the target hardware prototype, thereby increasing the overall planned software development time.

In order to facilitate parallel development of the target program and target hardware, simulators are often used to test the hardware and the software intended to be executed by the hardware. The target hardware can be simulated at the chip, board, and system level to varying extents. Because of the availability of simulated target hardware, there is a significant benefit to including the target program in a system simulation, including the chance to debug code and verify the correct operation of both the target program and target hardware before the target hardware is built. Problems associated with the interaction between the target hardware and the target program can be detected and corrected before final hardware fabrication, often saving costly and time-consuming redesign of the ASIC.

There are several techniques that are used to simulate execution of a target program on target hardware before the target hardware has been fabricated. One approach is to simulate the hardware using a computer hardware simulator. The hardware simulator is a software program that accepts a description of the target hardware, including electrical and logical properties of the target processor and the target circuitry. Based on the description, the hardware simulator simulates signal propagation and logical functionality of the target hardware event by event. It should be noted that a typical microprocessor instruction cycle is actually the result of a large number of hardware events within the target. Thus, the hardware simulator attempts to represent signal timing, signal strength, and logical function as accurately as possible, often enabling sub-nanosecond timing accuracy in simulating these hardware events. To achieve this degree of accuracy for a highly complex target processor, functions are often represented with detailed structures.

A target program is compiled into object code, and the object code is downloaded into a processor memory model within the hardware simulator. A processor functional model is a software description, including the electrical and logical properties, of the target processor, while a target circuitry functional model provides a model of the target circuitry, such as an ASIC, or other custom or semi-custom design. The hardware simulator allows the processor functional model to simulate execution of the target program event by event.

Although the hardware simulator can provide valuable information to a software developer, there are disadvantages in using the hardware simulator to simulate the target hardware. The full-functional processor model can be extremely detailed for a complex circuit, such as the target processor, and thus difficult to model. The resulting simulation may be very accurate; however, the level of detail comes at the cost of lengthy simulation times. The execution time required to simulate the full-functional processor model can add significantly to the simulation run-times because the hardware simulator must simulate all activity that occurs in the target processor using the processor functional model to detect timing errors, race conditions, and the like. The target program can also be quite long. The additional burden of trying to run longer simulation required for larger target programs into the processor memory model can consume large amounts of system resources, and simulation run time can become unacceptably long. The software developer also has the unenviable task of debugging the target program when the target program malfunctions. This debugging task must typically be accomplished without the aid of debuggers or any other software design and analysis tools.

Another form of software simulation is an instruction set simulator (ISS). There are several types of ISS systems which take different approaches to simulating the execution of a target program on a target processor. One approach of the ISS provides the results of the execution sequence, but does not provide any detail on the execution time. The software program is compiled, and the register movement of information is carried out to provide the results of the execution sequence. However, there is no correlation between the execution of the software program in a host system, and the execution time of the software program in the target system.

Another approach is provided by an architectural ISS. This type of simulator faithfully reproduces the flow of the instructions through the components (i.e., architecture) of the target processor on an instruction-by-instruction, clock cycle-by-clock cycle basis. The total estimated execution time is the product of the number of clock cycles simulated by the ISS times the period of the target processor clock. Although this method provides accurate estimated execution times, the process is very time consuming. The instruction flow (and concomitant clock cycles) must be calculated for each instruction encountered during the program sequence. In a case where a block of code having several instructions is directed to loop 10,000 times, an estimated execution time for each instruction in the block of code must be calculated 10,000 times as well. A typical software program has several of these types of loops, resulting in a very lengthy process for calculating a total estimated execution time. Additionally, whenever the software program is modified, this calculation must be performed again to generate a new estimated execution time. The consequence is an inefficient use of resources and time.

Another type of simulation uses a statistical model to estimate the execution time of a target program on a target system. This method deconstructs the software program into basic blocks of code and estimates an execution time for each block. A probability-based flow analysis technique is then used to estimate the total execution time for the software program. A more detailed description of this type of simulation is provided in D. D. Gajski et al., pp. 290–305, *Specification and Design of Embedded Systems*, PTR Prentice Hall, Englewood Cliffs, N.J., 1994. Although the static estimation technique provides faster results than for the other simulation methods previously mentioned, this method is only as accurate as the statistical model used to calculate the estimated execution time. Additionally, there are several limitations with respect to using the static estimation technique for target processors having pipelined processing, instruction pre-fetching, vector processing and caching.

Therefore, there is a need for an software analysis system and simulation technique that can be efficiently performed and provide reasonably accurate performance information for the simulated execution of a target program on a target system.

SUMMARY OF THE INVENTION

The present invention is embodied in a method and system for simulating the execution of a software program on a simulated hardware system. The system includes a memory for storing software parameters describing program segments of the software program, and for storing hardware parameters that at least partially define the simulated hardware system. The system further includes a processor for calculating an estimated execution time for the software program using the software and hardware parameters. The software program is instrumented with tags, which are function calls inserted into the software to cause measurements to be performed while the software is running. These tags are used to delineate program segments of the software program and then the software program is analyzed for data describing the program segments. The data is tabulated and indexed according to the program segments. The instrumented software program is also compiled to be executed on a host system. When a coverage tag is executed by the host system, the processor obtains the hardware parameters and the software parameters corresponding to the executed coverage tag, and calculates the estimated execution time for the program segment corresponding to the executed coverage tag. The estimated execution time for the program segment is added to a running total for the overall execution time of the software program.

In accordance with another aspect of the invention, the system further maintains an instruction cache image that keeps a record of the contents of an instruction cache of a simulated processor of the simulated hardware system. The system updates the instruction cache image after a program segment is executed.

DETAILED DESCRIPTION OF THE INVENTION

Figure 1:
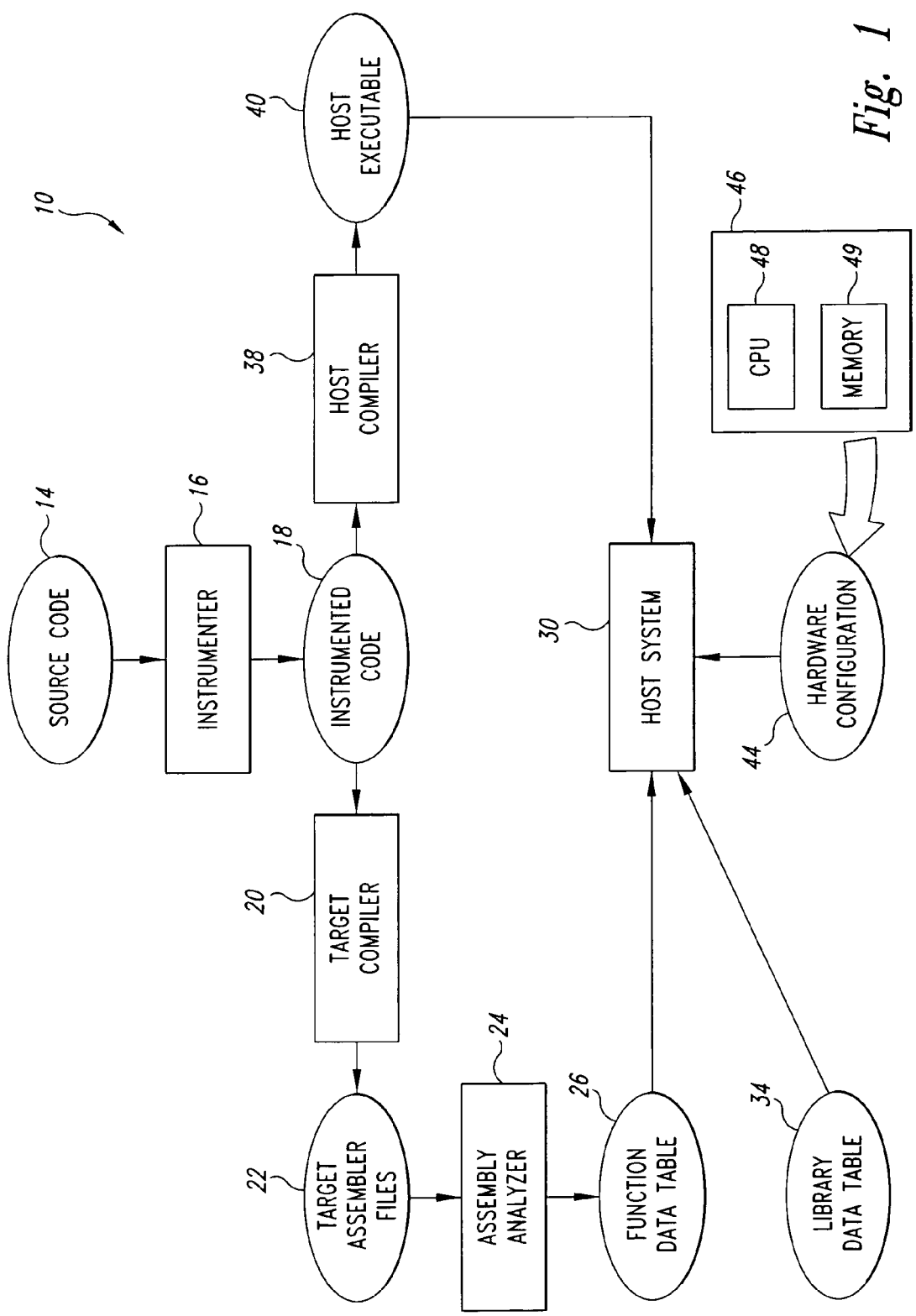
FIG. 1 is a functional block diagram of an embodiment of the present invention.

The disclosed embodiment of the present invention allows for the early simulation of the target hardware and permits the parallel development of the target hardware and the target program. The disclosed system also allows the extensive use of existing debugging tools to aid the developer in the development and integration of the target system. The embodiments of the present invention calculate an estimated target program execution time for a simulated target hardware, as well as maintain an instruction cache image of the simulated target processor. The estimation technique accounts for detailed characteristics of the simulated target processor architecture, such as parallel execution, pipelining, caches, and pre-fetching. The information provided can be used by the software developer to forecast resource requirements, and identify target hardware bottlenecks and resource constraints prior to having the physical target hardware. Although there are conventional hardware simulators that provide greater simulation accuracy, simulation of target hardware by the embodiments of the present invention is simple by comparison, and provides relevant information relatively quickly and inexpensively. The benefit of having this type of information early in the development cycle enables the target hardware and software to optimized for one another, thus avoiding the "force-fitting" of the target software to the target hardware prototype.

The hardware parameters of the simulated target hardware may be modified relatively easily by changing variables of a hardware configuration file. The hardware configuration file is maintained separately from the tabulated information related to the code segments of the target program. Consequently, the hardware parameters may be modified without also requiring the software developer to modify the target program as well. Furthermore, the hardware parameters of the simulated target hardware are described at a relatively high level to avoid the complexity of detailed modeling parameters that may be required for convention hardware simulators.

The execution time of the target program is estimated by separating the program into code segments bounded by branch points, estimating the execution time for each of the code segments for a simulated target processor, and then summing together the estimated execution times of each code segment encountered during execution of the software program by a host system. Rather than using a static or statistical model of software execution, as in the prior art, the estimation technique described herein is a dynamic method that is more accurate because it uses the actual sequence of execution. The total estimated execution time for the program for the simulated processor is the sum of the estimated execution times of code segments executed. An image of the instruction of a simulated target processor is maintained so that the software developer may review its contents following the execution of a code segment.

An analysis system 10 according to an embodiment of the present invention is illustrated in FIG. 1. A source code 14 is instrumented with various tag statements by a source code instrumenter 16 resulting in an instrumented source code 18. Among the tag statements instrumented into the source code 14 are coverage tags. Coverage tags are generally placed in branches of the source code 14, and when executed, generate a tag value which reflects that the branch in which the coverage tag is located has been executed. A more detailed description of a software analysis system for analyzing software instrumented with tag statements, including coverage tags, is provided in U.S. Pat. No. 5,748,878 to Rees et al., which is incorporated herein by reference. With respect to the embodiments of the present invention, the coverage tags serve the additional function of defining the code segments for which an estimated execution time is calculated. A benefit of employing coverage tags such as those described in the Rees et al. patent is that the source code 14 may not need to be re-instrumented for debugging when the physical target hardware becomes available.

The instrumented source code 18 is compiled to assembler files 22 using a target compiler 20 and options chosen for the simulated target processor and production executable. The effect any assembly optimization techniques will have on the estimated execution time of the target program is integrated into the estimation process as a result of using the real target compiler 20 to produce the assembler files 22. The assembler files 22 are in turn analyzed by an assembly analyzer 24 to produce data regarding each of the code segments. The data is tabulated in a function data table 26 which is implemented in a host system 30, and indexed by unique tag numbers representing each code segment. The tag numbers correspond to the tag value produced by the coverage tags instrumented in the source code 14 when executed. The type of data produced by the assembly analyzer 24 for each code segment may include:

- tag number
- function name
- number of instructions
- number of data accesses
- number of CPU cycles (due to superscalar architecture, etc.)
- stack data size
- tag number of predicted branch
- instruction memory type (for instruction access time)
- cache flag (cache/do not cache)

This list is not meant to be exhaustive, but is provided merely by way of an example. As a further example, the type of data may also include the following:

| | |
|---|---|
| tagNumber | Tag number: A number assigned by the source code instrumenter to uniquely identify each program segment |
| functionName | Function name: The name of the function which contains the program segment |
| numberOfInstructions | Number of instructions: The number of instructions which will need to be fetched in order to execute the program segment |
| numberOfDataAccesses | Number of data accesses: The number of data accesses performed inside the program segment |
| numberOfCycles | Number of CPU cycles: The number of CPU cycles needed to execute the program segment. This number may be very different from the number of instructions because the target processor can have a superscalar architecture, and the assembly code can have in-lined loops. |
| stackDataSize | Stack data size: The number of data words stored on the data stack for the function containing the program segment. This information may be useful for estimating the percentage of data cache hits. |
| predictedBranchTag | Predicted branch: The tag number for the branch which is predicted to follow the program segment. In many systems, there will be an execution delay if the predicted branch is not taken. |
| memoryFlag | Instruction memory type: The type of memory in which the program segment will reside in the target system. Each such memory type (e.g., RAM and FLASH) may have a different number of wait states. |
| memoryFlag[1] | Cache flag: A flag to indicate that the program segment can either reside in cache (cache enabled) or cannot reside in cache (cache inhibited). |
| syncPointFlag | Synchronization point flag: A flag indicating that execution of the program segment should cause the code execution to be re-synchronized with the Stratus virtual hardware environment. This is an annotation supplied by the user. |

Note that in general, the above data may be tabulated multiple times for the same code segment, but with different predicted branch tag numbers. It will be appreciated that more or less data for each code segment may be tabulated in the function data table 26. A more detailed description of the assembly analyzer 24 will be provided below.

Where the software developer has been provided only with a compiled version of the target software rather than the source code, which may be the case where a portion of the target software has been written by a different software developer, a library data table 34 may be provided in place of the function data table 26. The library data table would contain similar data as that tabulated in the function data table 26 such that the library data table 34 can be referenced to calculate the estimated execution time for the code segments of the compiled version of the target software. One preferred method for invoking the information in the library data table is to instrument the available source code with external function tags which indicate when a library function is being called. A technique for doing this is described in the patent application "Instrumentation Tagging for Testing and Debugging a Computer Program having Source Code Unavailable for Instrumentation." by Sidney R. Maxwell, bearing application Ser. No. 09/234,785, filed Jan. 20, 1999 and commonly owned with the present application. Other techniques for invoking the information in the library data table may also be used. When encountered in the program, these external function tags would access the information in the library data table. It is also possible to use instruction-level instrumentation in the host version of the library to accomplish a similar effect.

The instrumented source code 18 is compiled again using the host compiler 38 to provide a host executable 40 that will eventually be executed in the host system 30. Whenever a coverage tag in the host executable 40 is executed by the host system 30, a Tag function is called by the executed coverage tag to reference the function data table 26 and obtain the data indexed under the unique number provided to the Tag function by the executed coverage tag. As will be explained in more detail below, the Tag function calculates the execution time of the corresponding code segment and adds this value to a running total for the total target program execution time.

In addition to referencing the function data table 26, the Tag function references a hardware configuration file 44 to obtain hardware parameters defining a simulated target hardware system 46. The target hardware includes a target processor 48 as well as target circuitry, such as a target memory 49. These hardware parameters may be provided by the software developer. Prior to executing the host executable 40 on the host system 30, the data of the hardware configuration file 44 is provided to the host system 30 during an initialization sequence. The hardware parameters stored in the hardware configuration file 44 include parameters that can be observed directly from the hardware design of the target hardware 46, as well as parameters that may be calculated analytically from a known design or estimated experimentally. For example, some hardware parameters that may be directly observed from the hardware design are:

| Processor parameters | |
|---|---|
| $t_{cpu}$ | CPU cycle time: The period of a single cycle of the CPU clock |
| $C_{L1}$ | Size of L1 cache: Number of instructions that can be stored in L1 cache |
| $C_{data}$ | Size of data cache: Number of bytes of data that can be stored in the data cache |
| $t_{L2}$ | L2 access time per instruction: The amount of time it takes to transfer an instruction from L2 cache to L1 cache |
| $C_{L2}$ | Size of L2 cache: Number of instructions that can be stored in L2 cache |
| $t_{bus}$ | Bus cycle time: The period of a single cycle of the bus clock |
| $N_{bus}$ | Bus transfer cycles: Minimum number of bus cycles for transfer of a single data word |
| $C_{cache}$ | Cache line size: The number of instructions (or data words) which are transferred in a single cache line. |
| $N_{cache}$ | Cache line bus cycles: The number of bus cycles required to transfer a line of data or instruction cache |
| $N_{pipe}$ | Bus pipeline length: Number of bus transactions which can be in process while waiting for a given bus transaction to complete |
| $N_{interrupt}$ | Interrupt hardware cycles: Number of CPU cycles between the time an interrupt is asserted at the processor pin and the time the instruction at the interrupt vector begins executing |
| Storage parameters | |
| $N_{pgm-store}$ | Program store wait states: Number of additional bus cycles required to access the program store memory |
| $N_{data-store}$ | Data store wait states: Number of additional bus cycles required to access the data store memory |
| $N_{volatile}$ | Volatile store wait states: Number of additional bus cycles required to access a given volatile storage element (such as a register in an ASIC). This number could be different for each IC on the processor bus. |

Another example of possible hardware parameters in another embodiment include the following:
Target processor parameters:
CPU cycle time
Size of L1 cache
Size of data cache
Size of L2 cache
L2 cache access time per instruction
Bus cycle time
Interrupt hardware cycles
Program store parameters:
wait states
Data store parameters:
wait states
Volatile store parameters:
wait states Examples of hardware parameters that may be calculated analytically from a known design are the instruction look-ahead factor, which is a function of the cache policy, and the average size of data beat, which is approximately the same as the memory width.

Some examples of hardware parameters that can be estimated experimentally are the data look-ahead factor, the real-time operating system (RTOS) kernal overhead percentage, and the RTOS interrupt instructions. The data look-ahead factor can be estimated by running a program which creates a data array that is too large to fit in the data cache, and then runs a set of experiments with increasing amounts of computation between data accesses. In each experiment, execution time is measured for the same computation with and without data accesses. In the first experiment, each element of the data array is read successively with an absolute minimum of computation. This measurement is then repeated with essentially the same computation, but without the data array accesses. The difference between these two execution times provides a first estimate of the data access time. This experiment is then repeated with increasing amounts of computation between data accesses. Results of these experiments can be analyzed by plotting data access time as a function of computation time. What should be observed is that the amount of time consumed by data accesses decreases approximately linearly from some upper limit for very small amounts of computation to a lower limit for relatively large amounts of computation. The slope of this curve is the data look-ahead factor. The lower limit of the data access time should be noted as well.

In order to experimentally estimate the RTOS kernel overhead percentage, the execution time of the test program is measured both when the program is run as a stand-alone program on the target hardware 46, and when the program is run as a task by the RTOS. Any difference in execution time is assumed to be RTOS overhead. This experiment should probably be run with several test programs of different length in order to make sure that the modeling method is valid, as well as to obtain more accurate parameters.

The RTOS interrupt instructions parameter must be determined through a hardware measurement. Ideally, one would want to measure the time between assertion of the hardware interrupt and access to the address of the associated interrupt service routine (ISR). However, this method may not be possible where there is instruction caching. That is, the ISR could be present in the instruction cache, so that the address of the first instruction in the ISR might never show up on the address bus. In order to avoid this difficulty, the ISR in the test program should write immediately to a static address chosen from the memory map of the test circuit. The total interrupt latency can then be measured as the delay between the assertion of an interrupt at the pin of the processor and the appearance on the address bus of the write address from the ISR.

Once the total interrupt latency has been measured, it can be decomposed into its component parts. The interrupt latency should be measured with and without the RTOS. In the absence of the RTOS, the interrupt latency should turn out to be the sum of the hardware latency plus the function call time. However, this assumption should be verified by the software developer. With the RTOS, any increase in interrupt latency will be attributed to the RTOS.

It will be appreciated that the type of hardware parameters included in the hardware configuration file 44 may include more or less than that described above and still remain within the scope of the present invention. As with the types of code segment data tabulated in the function data table 26, the types of data that may be included in the hardware configuration file 44 described herein is not intended to be exhaustive.

As mentioned previously, when a coverage tag is executed by the host system 30, a Tag function is called to calculate the execution time of the code segment corresponding to the executed coverage tag. The execution time of a code segment is calculated with respect to the following variables:

| Time | |
|---|---|
| $t_{ex}$ | Segment execution time: The amount of time it will take to execute the program segment given the current cache contents. This is the expected execution time. |
| $t_{min}$ | Minimum execution time: The execution time if all data accesses hit in data cache |
| $t_{max}$ | Maximum execution time: The execution time if all data accesses miss in data cache and require a bus transaction |
| $\sigma_{est}$ | Estimation variance: The variance of the estimate for an individual program segment. Note that the variance reported by the estimation procedure will be the root-mean-square of the individual variances. |
| $n_{cache}$ | Data cache hit rate: The percentage of data accesses which hit in data cache. If no better procedure is available, this parameter will be supplied by the user. |
| $t_{processor}$ | CPU time: Time needed to execute the instructions, including the effects of parallel instruction execution and branch prediction. |
| $t_{instruction}$ | Instruction access time: Additional time required to make the instructions available, including the effects of caching (Li and L2) and the wait states associated with program memory (RAM, ROM and FLASH). |
| $t_{data}$ | Data access time: Additional time required to make the data available, including the effects of data caching, look-ahead accesses, and access to volatile memory. |
| $t_{interrupt}$ | Interrupt latency: The total delay between when an interrupt is asserted at the processor pin and when the associated ISR begins execution |
| Run time instruction cache parameters | |
| $N_{L1}$ | L1 cache load size: The number of instructions from the program segment which are not currently resident in L1 instruction cache |
| $N_{L2}$ | L2 cache load size: The number of instructions from the program segment which are not currently resident in either L1 or L2 instruction cache |

The execution time for a program segment consists of three components: time spent in the CPU processing the instructions, time spent getting the next instructions, and time spent reading and writing data. Although it will be possible to accurately estimate the CPU processing time and the instruction access time, it will not be possible to accurately estimate the data access time because that will, in general, be data-dependent. The most general version of the estimation procedure will therefore yield a minimum, maximum, and expected execution time, along with an estimation variance.

$$t_{max} = t_{processor} + t_{instruction} + t_{data}$$

$$t_{min} = t_{processor} + t_{instruction}$$

$$t_{ex} = t_{processor} + t_{instruction} + n_{cache} * t_{data}$$

$$\sigma_{est} = 1/6 * ((t_{max} - t_{ex})^2 + (t_{min} - t_{ex})^2)$$

For processor architectures which involve pipelining, branch prediction and pre-fetching, the number of clock cycles spent executing a program segment in the CPU will, in general, be a function of the program segment which follows it. That is, there will be clock cycles wasted due to branch mis-prediction. Also, the time taken to execute a switch statement may be an even more complex function of the branch taken. Thus, to make the solution suitably general, the number of CPU cycles is expressed as a function of the preceding tag and the current tag. Thus, the tag table will have entries for a number of possible pairs of tags. The resulting equation is $$t_{processor} = numberOfInstructions(tagNumber, predictedBranchTag) * t_{cpu}$$

Namely, the number of instructions, which is a function of the tag number and the predicted branch tag, is multiplied by the CPU cycle time. The amount of time spent reading instructions from memory is heavily dependent on instruction caching behavior. It is assumed, however, that instruction processing will be performed in parallel with instruction access, so that the cpu cycle time can be subtracted from the instruction access. The time taken to get an instruction from program store must take into account that instructions will usually be fetched as part of a cache line (and also the number of wait states for the program store). This calculation also takes into account the fact that the effects of pipeline delay in the CPU can be eliminated by counting the program segment length at a fixed location in the CPU pipe.

$$t_{instruction} = ((N_{L1} - N_{L2}) * (t_{L2} - t_{cpu})) + (N_{L2} * (t_{bus} * (N_{cache} + N_{pgm\_store})/C_{cache} - t_{cpu}))$$

If the result of the equation is less than zero, the answer is set equal to zero. It is assumed that processing must stop to await a data access. This is a somewhat pessimistic assumption; but anything more precise must take into account the fact that there may be instruction accesses as well as data accesses during a given program segment. If the processor contains a data cache, then the data access time is $$t_{data} = numberOfDataAccesses * t_{bus} * (N_{cache} + N_{data\_store})/C_{cache}$$

otherwise $$t_{data} = numberOfDataAccesses * t_{bus} * (N_{bus} + N_{data\_store})$$

Similarly, there will be some program segments for which the data access is to volatile memory. The data access time for these program segments is $$t_{data} = numberOfDataAccesses * t_{bus} * (N_{bus} + N_{volatile})$$

In an alternative embodiment, the execution time of a code segment is calculated based on the following principles and equations:

code segment execution time=CPU time+instruction access time+data access time.

The first component of the code segment execution time, the CPU time, is the time needed to execute the instructions of the code segment, including any affect from parallel instruction execution and branch prediction. The CPU time can be calculated from the equation:

CPU time=(number of CPU cycles+branch prediction penalty)*CPU cycle period where the number of CPU cycles to execute the code segment is obtained from the function data table 26 and, as will be explained in greater detail below, the branch prediction penalty may be experimentally obtained. The CPU cycle period is obtained from the hardware configuration file 44.

The second component of the code segment execution time, the instruction access time, is the additional time required to make the instruction available for execution by the target processor 48, and includes the effects of caching and the wait states associated with program memory. Single-level caches, as well as two-level caches having a primary L1 cache and a secondary L2 cache, are accommodated in the instruction access time calculation. The instruction access time may be calculated from the equation:

instruction access time=(number of instructions not in L1 cache*L2 access time per instruction)+(no. of instr. not in L1 or L2 cache*program memory access time per instr.)−(instruction look-ahead factor*CPU time).

The resulting instruction access time is added to the CPU time when it is greater than or equal zero. If the result is less than zero, the instruction access time is ignored. The program memory access time per instruction may be calculated from the equation:

program memory access time per instr.=bus cycle time*program memory wait states.

Information related to the size of the L1 and L2 caches, cache access time, memory access time, bus cycle time, and memory wait states are provided by the hardware parameters of the hardware configuration file 44. The number of instructions not in the caches, and consequently, the number of instructions that must be loaded from program memory, will be calculated based on information provided from an Instruction Cache model of the simulated target processor 48. The Instruction Cache model will be explained in greater detail below.

The third component of the code segment execution time, the data access time, is the additional time required to make the data available for the target processor 48, and includes the effects of data caching, look-ahead accesses, and access to volatile memory. The data access time may be calculated from the equation:

data access time=(size of data stack not in data cache*data memory access time per byte)+(number of volatile accesses*volatile memory access time)−(instruction access time, if nearly zero*data look-ahead factor*CPU time).

The resulting data access time is added to the CPU time and instruction access time when it is greater than or equal to zero. Otherwise, the data access time is ignored. The data memory access time per instruction may be calculated from the equation:

data mem. access time per byte=(bus cycle time*data mem. wait states)/average size of data beat, and the volatile memory access time may be calculated from the equation:

volatile mem. access time=bus cycle time*volatile memory wait states.

The hardware parameters, such as the data memory access time per byte, and data and volatile memory wait states, are obtained from the hardware configuration file 44.

It will be appreciated that the various equations provided above for calculating the code segment execution time may be modified and remain within the scope of the present invention. The equations may be modified in light of the hardware configuration of the simulated target hardware 46. For example, if the simulated target processor 48 has only a single-level instruction cache, the equation for calculating the instruction access time will be to:

$t_{instruction}=N_{L1}*(t_{bus}*(N_{cache}+N_{pgm\_store})/C_{cache}-t_{cpu})$

If the result of the equation is less than zero, the answer is set equal to zero. Two additional factors which must be considered in a real-time system are interrupt latency and RTOS kernal overhead. These two factors can be estimated using the following parameters:

| RTOS parameters | |
|---|---|
| $N_{RTOS}$ | RTOS context switch instructions: The average number of instructions executed by the RTOS to perform a context switch |
| $N_{kernal}$ | RTOS microkernel size: The number of instructions which must be loaded in order to run the RTOS microkernel (e.g., as part of a context switch) |
| $N_{RTOS-int}$ | RTOS interrupt instructions: Number of instructions executed by the RTOS interrupt handler before the user's ISR is called |

The first two parameters can be derived from data provided by the RTOS supplier, while the third parameter can be determined through a hardware measurement. Ideally, one would want to measure the time between assertion of the hardware interrupt and access to the address of the associated ISR; however that measurement could be invalidated by instruction caching. That is, the ISR could be present in the instruction cache, so that the address of the first instruction in the ISR might never show up on the address bus. In order to avoid this difficulty, a test program should be written in which the ISR writes immediately to a static address chosen from the memory map of the test circuit. The total interrupt latency can then be measured as the delay between the assertion of an interrupt at the pin of the processor and the appearance on the address bus of the write address from the ISR. This total interrupt latency should be measured with and without the RTOS.

Once the total interrupt latency has been measured, it can be decomposed into its component parts. The interrupt latency should be measured with and without the RTOS. In the absence of the RTOS, the interrupt latency will be the sum of the hardware latency plus the function call time. With the RTOS, any increase in interrupt latency will be attributed to the RTOS.

The interrupt latency must be added to the execution time every time an ISR is called. This delay is calculated as $$t_{interrupt}=(N_{interrupt}+N_{RTOS\_int})*t_{cpu}$$

In addition, the RTOS interrupt handler may need to be loaded into instruction cache, causing additional delay essentially as described in the equation for $t_{instruction}$. If the RTOS interrupt handler is not described in the Library Function Table, then the microkernal size, $N_{kernal}$, may be used to estimate the time to load the cache.

As will be appreciated, other techniques that fall within the scope of the invention may also be used, for example, the equations for calculating the instruction access time may be:

instruction access time=(number of instr. not in $L1$ cache*program memory access time per instr.)– (instruction look-ahead factor*$CPU$ time).

This equation may further be modified depending on the desired accuracy of the instruction access time calculation. For example, if the software programmer determines that the effect of the instruction look-ahead factor is negligible, then the deduction from the instruction access time due to this factor can be ignored, resulting in a modified instruction access time equation:

instruction access time=number of instr. not in $L1$ cache*program memory access time per instr.

Modifying the time equations to adjust the desired accuracy may be helpful to the software programmer where rough time calculations will suffice.

Two additional factors that should considered when estimating the execution time of a code segment in a real-time operating system are interrupt latency and RTOS kernal overhead. The interrupt latency may be estimated from the equation:

interrupt latency=hardware interrupt latency+software interrupt latency~hardware interrupt latency+ RTOS interrupt latency~$CPU$ cycle time*[hardware interrupt cycles+RTOS interrupt instructions*instructions per $CPU$ cycle)].

This equation assumes that the interrupt latency is the sum of the hardware and software interrupt latencies, and further assumes that the software interrupt latency may be estimated by the RTOS interrupt latency.

The RTOS kernal overhead may be calculated from the equation:

RTOS kernal overhead=RTOS overhead percentage* segment execution time where the RTOS overhead percentage is obtained from the hardware configuration file 44 and the segment execution time is provided by the Tag function. This equation assumes that the RTOS kernal is invoked at every clock tick and performs about the same amount of work regardless of conditions. However, this assumption may not be accurate, and the software developer should determine its validity prior to simulation.

As mentioned previously, the instrumented source code 14 is compiled once using the target system compiler 20, and another time using the host system compiler 38. The resulting compiled target software 22 is analyzed by the assembly analyzer 24 which generates data regarding the program segments defined by the coverage tags instrumented in the source code 14, such as the number of instructions and data accesses between the coverage tags, the stack size, and similar data. The various data is organized into the function data table 26 and indexed by the tag numbers corresponding to the tag values of the coverage tags. The tabulated data is referenced by the host system 30 for calculating the execution time.

Figure 2A:
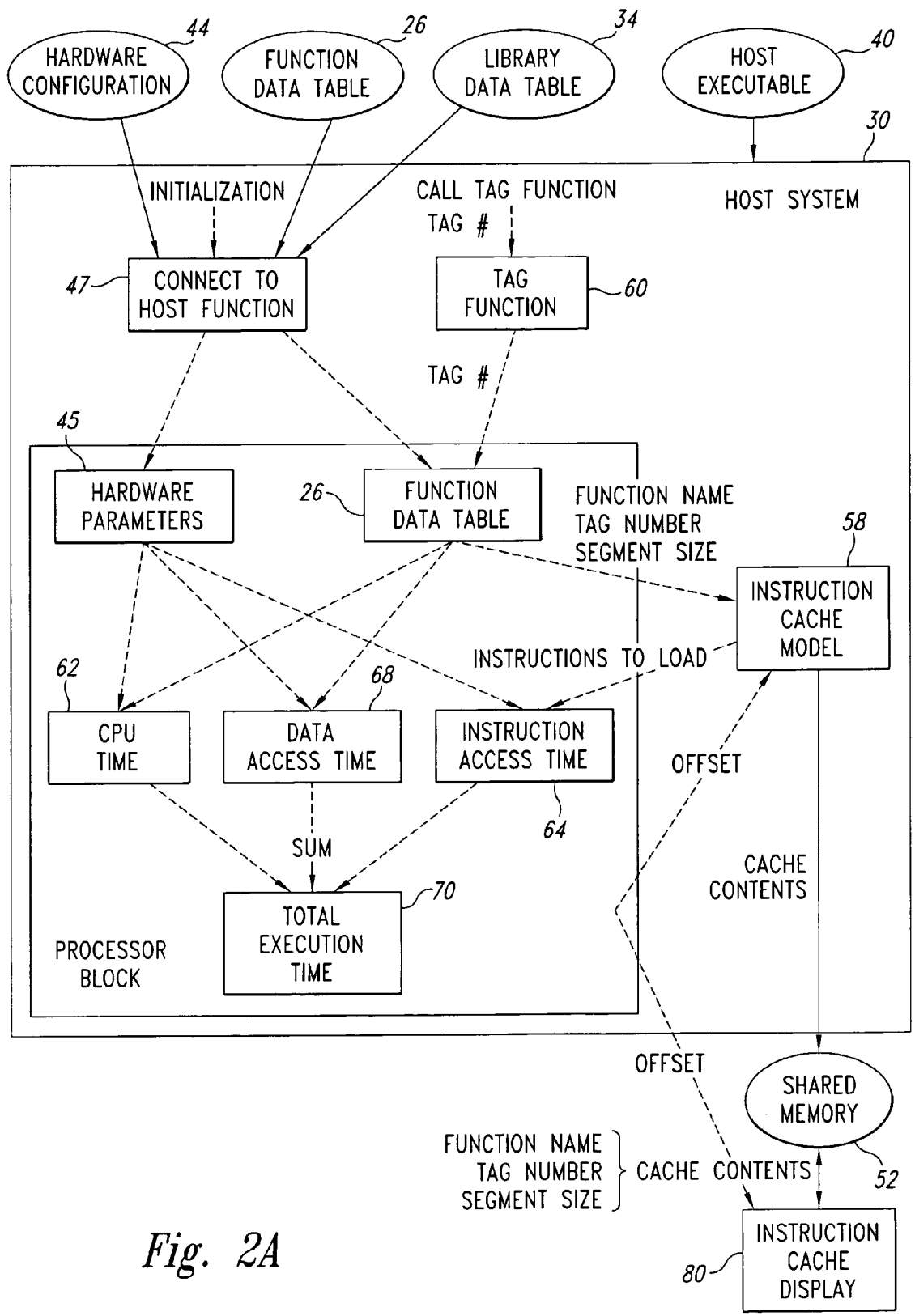
FIG. 2A is a functional block diagram of the host system of FIG. 1 of one embodiment of the present invention.
Figure 2B:
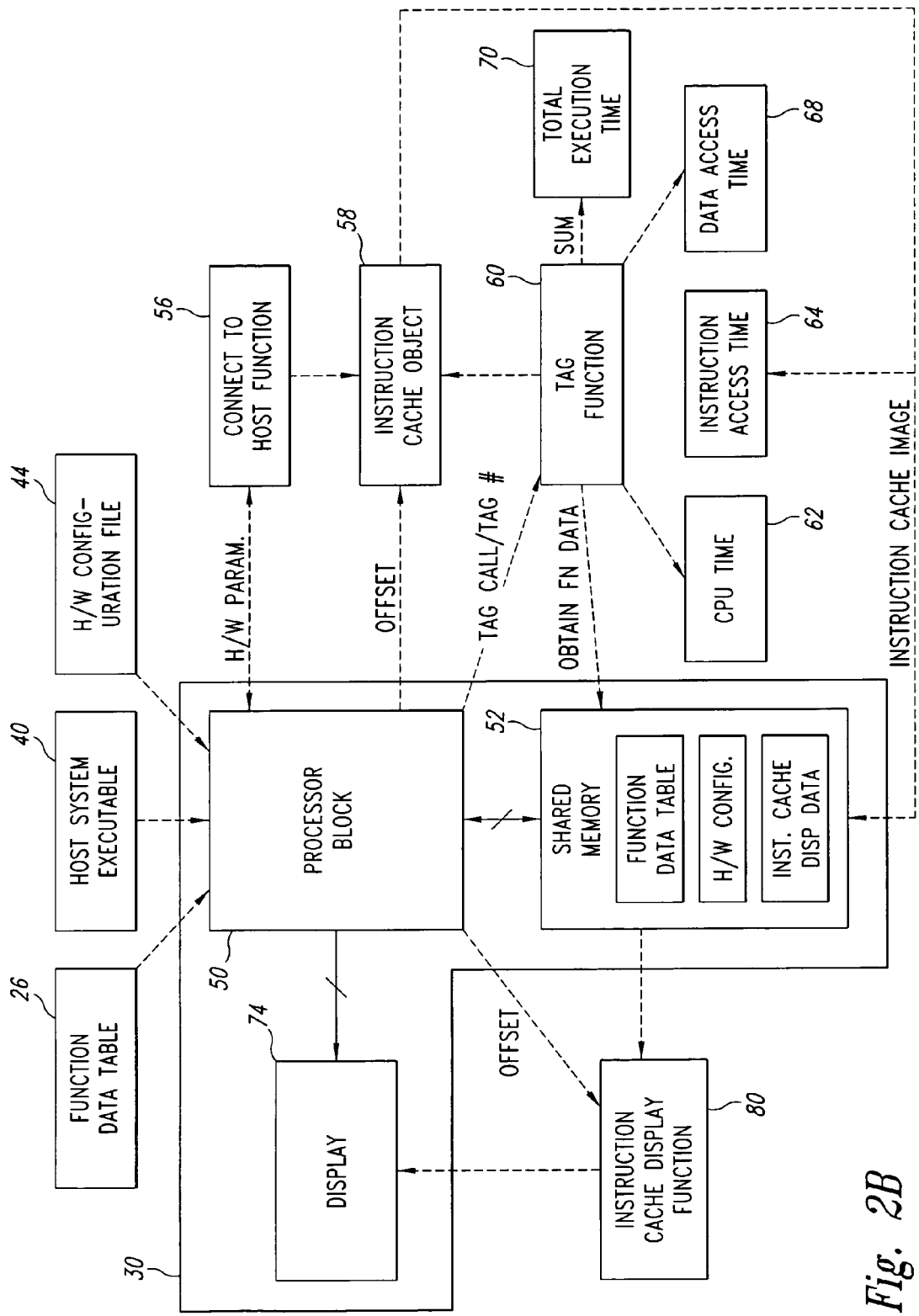
FIG. 2B is a functional block diagram of the host system of FIG. 1 of a second embodiment of the present invention.
Figure 3:
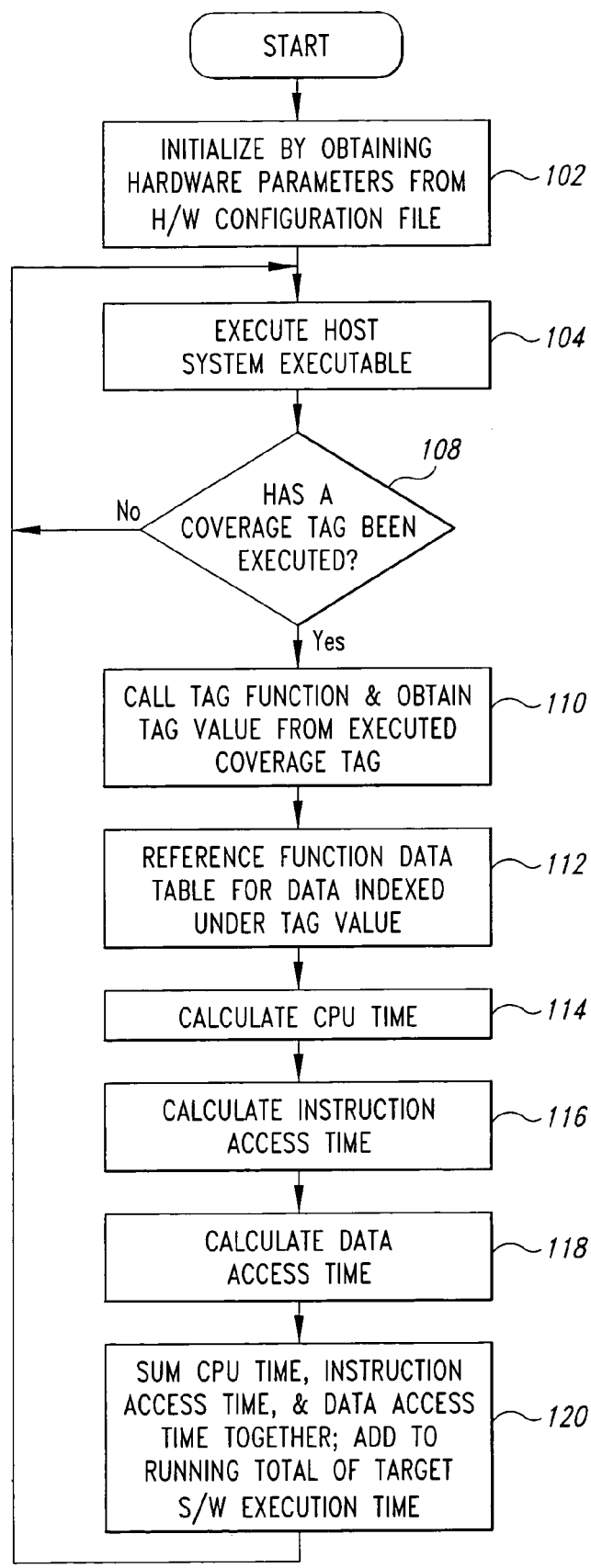
FIG. 3 is a flowchart illustrating the operation of the embodiment of FIG. 1.

The resulting host system executable 40 is executed on the host system 30. As shown in FIG. 2A, the alternative embodiment 2B and 3, upon initiating the execution of the host system executable 40, a Connect to Host function 56 will request the hardware parameters 45 from a processor block 50 of the host system 30 (step 102 of FIG. 3). As mentioned previously, the hardware parameters 45 are obtained by the processor block 50 from the hardware configuration file 44, which includes hardware parameters such as the CPU cycle time, the size of the cache, volatile memory access time, and the like. After the Connect to Host function 56 obtains the hardware parameters from the processor block 50, it constructs an Instruction Cache object 58 as directed by the processor block 50, and stores the rest of the hardware parameters obtained in a shared memory 52.

The host system executable 40, which includes the coverage tags instrumented into the source code 14 by the software developer, is executed (step 104) after the initialization sequence. When the coverage tags are executed by the host system 44 (step 108), the coverage tags call a Tag function 60 that performs the execution time calculation and provides the Tag function 60 a tag number (step 110) that corresponds to a code segment defined in the function data table 26 created by the assembly analyzer 24. The Tag function 60 references the function data table 26 (step 112) and obtains data indexed under the tag number, such as the number of instructions for the code segment, the number of CPU cycles, stack data size, and the name of the code segment corresponding to the tag number.

As discussed previously, the Tag function 60 calculates a total estimated execution time 70 by summing together a CPU time 62, an instruction access time 64, and a data access time 68. The general equations that are used by the Tag function 60 to compute these times use hardware parameters obtained from the hardware configuration file 44 and the data tabulated in the function data table 26 constructed by the assembly analyzer 24. The Tag function maintains a running total for the total execution time 70 of the target software on the simulated target processor 48. A running total for each portion of the total execution time 70 may also be maintained by the Tag function 60, that is, separate running totals for the CPU time 62, the instruction access time 64, and the data access time 68. After each coverage tag is executed by the host system 30, the Tag function 60 calculates the execution time for the corresponding code segment and adds the execution time to the running total.

The equations of the following example are specific applications of the more general equations for calculating the code segment execution time that were discussed previously. The following equations have been simplified from the more general equations in order to facilitate explanation and have been provided as merely examples.

The Tag Function 60 calculates the CPU time 62 of the total segment execution time 70 (step 114) from the data obtained from the function data table 26 and the hardware configuration file 44. Namely, the CPU time 62 may be calculated by using the equation:

$$t_{processor}=numberOfInstructions(tagNumber, predictedBranchTag)*t_{cpu}$$

where the number of CPU cycles for the segment corresponding to the tag number is obtained from the tabulated data, and the CPU cycle period is provided by the hardware configuration file 44. Namely, the number of instructions, which is a function of the tag number and the predicted branch tag, is multiplied by the CPU cycle time.

As an alternative, the CPU time 62 may be calculated using the equation.

CPU time=number of CPU cycles*CPU cycle period where the number of CPU cycles for the segment corresponding to the tag number is obtained from the tabulated data, and the CPU cycle period is provided by the hardware configuration file 44. Alternatively, the CPU time 62 can be calculated using the equation:

CPU time=(number of CPU cycles+branch prediction penalty)*CPU cycle period where the simulated target processor 48 employs a branch prediction technique. The value of the branch prediction penalty may be determined experimentally.

After calculating the CPU time 62, the Tag function 60 provides the segment name, number of instructions, tag number, and a cache flag to the Instruction Cache object 58 to calculate the instruction access time (step 116). The Instruction Cache object 58 maintains an image of the instruction cache of the simulated target processor 48 and carries out the calculation for the instruction access time 64 of the total execution time 70. The contents of the instruction cache image may be viewed by the software developer on a display 74.

In calculating the instruction access time, the Instruction Cache object 58 determines whether an instruction cache is used by checking the status of the cache flag from the function data table 26. If the cache flag indicates that an instruction cache is not used, the Instruction Cache object 58 calculates the instruction access time using the equation:

$t_{instruction}=numberOfInstructions*(t_{bus}*$
$(N_{cache}+N_{pgm\_store})/C_{cache}-t_{cpu}))$ Alternatively, the Instruction Cache object 58 may calculate the instruction access time using the equation:

instruction access time=number of instructions*program memory access time per instruction where the number of instructions is obtained from the function data table 26, and the program memory access time per instruction is the product of the bus cycle time and the program memory wait states, as discussed previously.

In the case where an instruction cache is employed, the Instruction Cache object 58 determines whether the code segment defined by the currently executed coverage tag is present in the instruction cache image. If the code segment is present, a zero is returned by the Instruction Cache object 58 to the Tag function 60 which represents the fact that no time will be added to the total execution time 70 for instruction access time. However, if the code segment is not present, the contents of the instruction cache image are removed according to the caching policy, and the currently executed code segment must be loaded.

The time to load the code segment may be calculated in two ways, depending on whether the simulated target processor 48 utilizes a single- or two-level cache design. In a single-level cache design, the time to load the code segment may be calculated using the same equation as for calculating the instruction access time where the instruction cache is not used. However, for a two-level cache design, having a primary L1 cache and a secondary L2 cache, the time may be calculated using the equation:

$t_{instruction}=numberOfInstructions*(t_{L2}-t_{cpu})$

Alternatively, the equation:

instruction access time=number of instructions*L2 access time per instruction may be used where the L2 access time per instruction is provided by the hardware configuration file 44.

After the instruction access time 64 is calculated, the Instruction Cache object 58 updates the instruction cache image in the shared memory 52 so that the software developer can view the most recent contents even if the target software has stopped.

The data access time 68 is calculated by the Tag function 60 in a manner similar to the instruction access time 64 (step 118). That is, the data access time 68 is the time necessary to load the data cache with the data not already present. The relevant data to calculate the data access time 68 is obtained by the Tag function 60 from the function data table 26 and the hardware configuration file 44.

The Tag function 60 sums together the CPU time 62, the instruction access time 64, and the data access time 68, and adds the result to the running total for the total estimated execution time 70 of target software for the simulated target processor 48 (step 120). The software developer can view the running total of the execution time and the contents of the instruction cache on the display 74 by accessing the shared memory through a user interface. An example of such a user interface is provided in the Rees et al. patent, previously referenced. The user interface requests the processor block 50 of the host system 30 to display the contents of the instruction cache image. The processor block 50 allocates a section of the shared memory 52 to store instruction cache display data, and causes a Instruction Cache Display function 80 to be constructed. The processor block 50 further provides an offset of the shared memory 52 to the Instruction Cache Display function 80 and to the Instruction Cache object 58. The Instruction Cache object 58 updates the image of the instruction cache, and the Instruction Cache Display function 80 displays the data found in the shared memory 52.

Figure 4A:
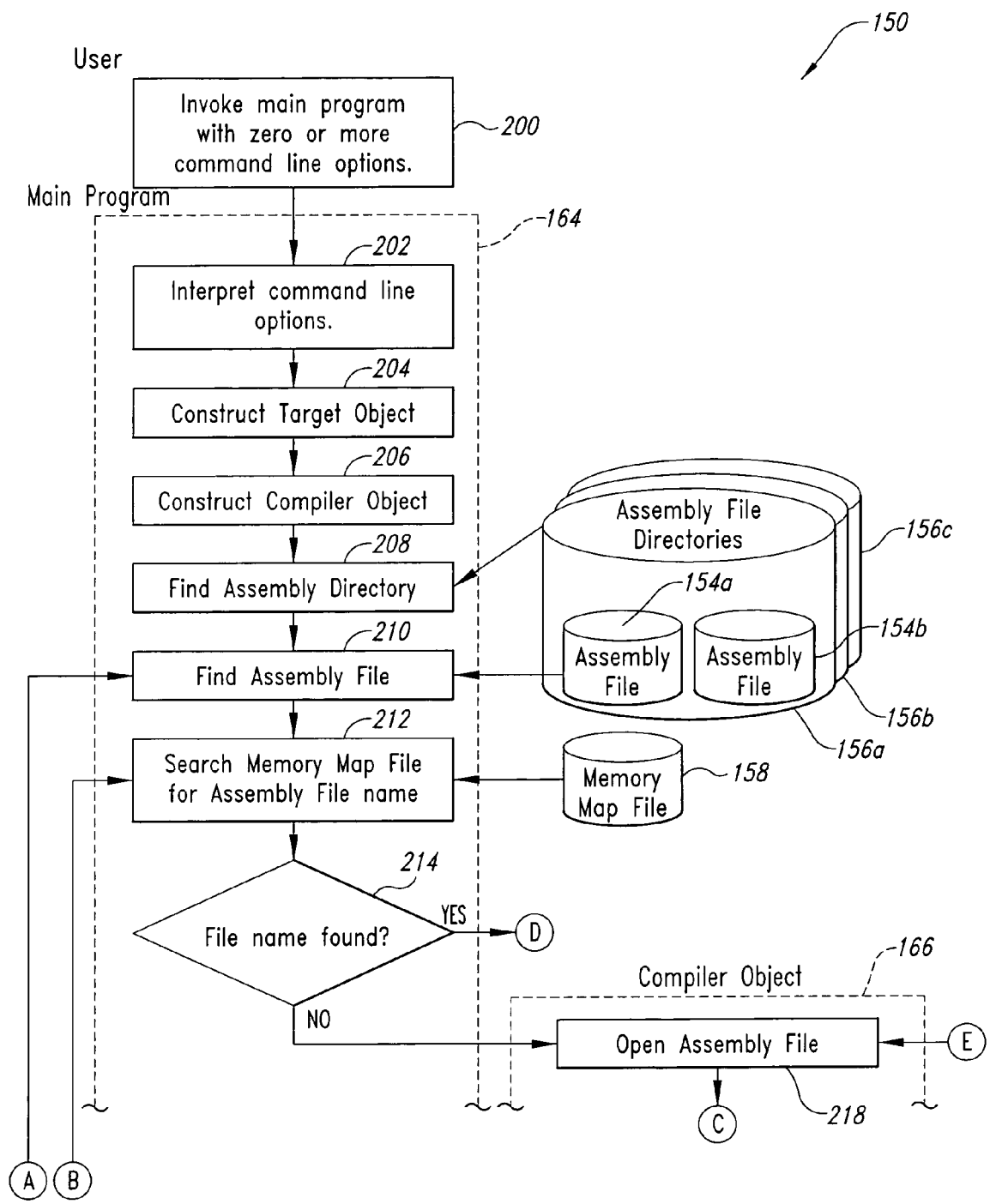
FIGS. 4A–C are an embodiment of an assembly analyzer that may be used in the analysis system of FIG. 1.
Figure 4B:
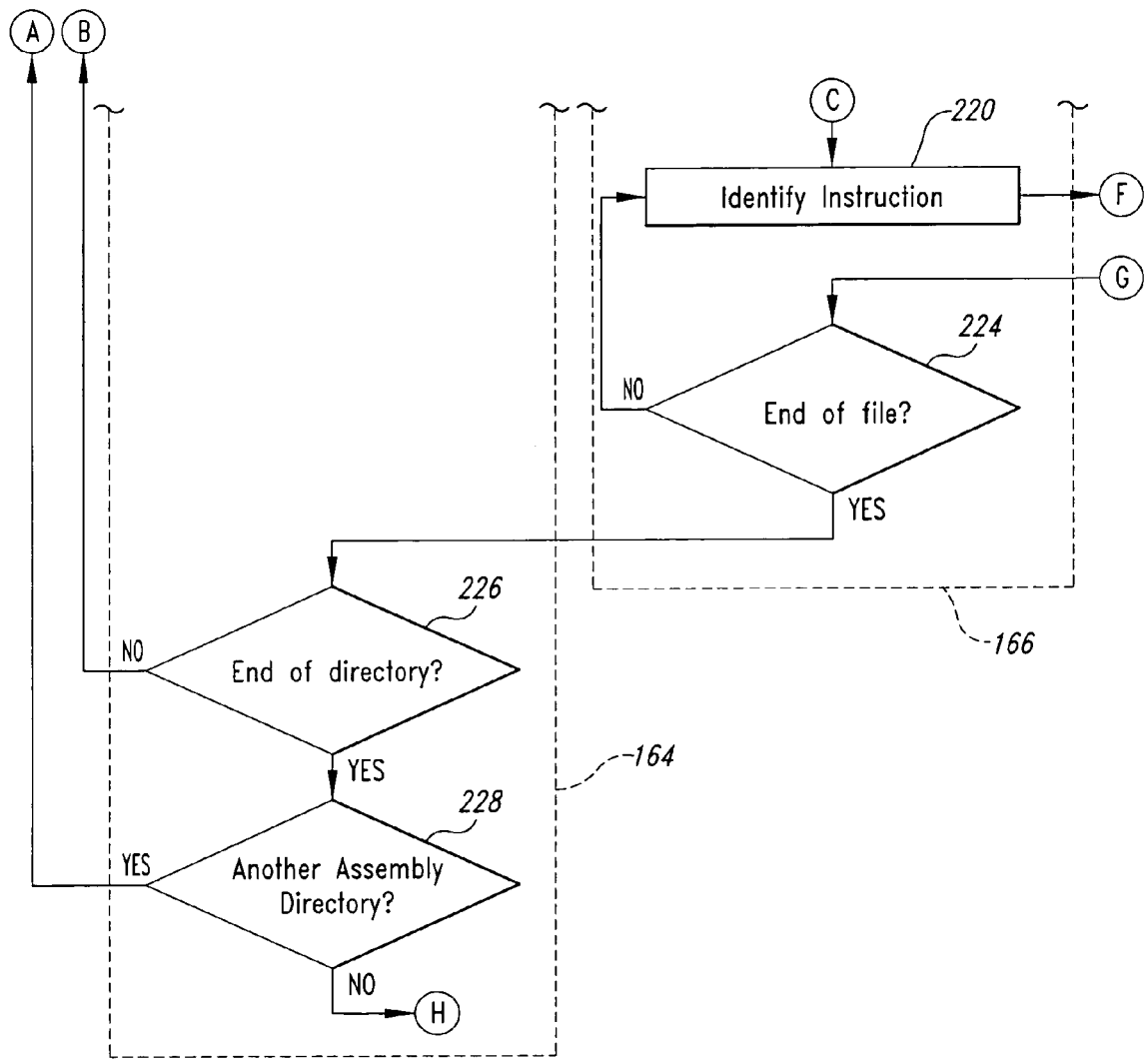
Figure 4C:
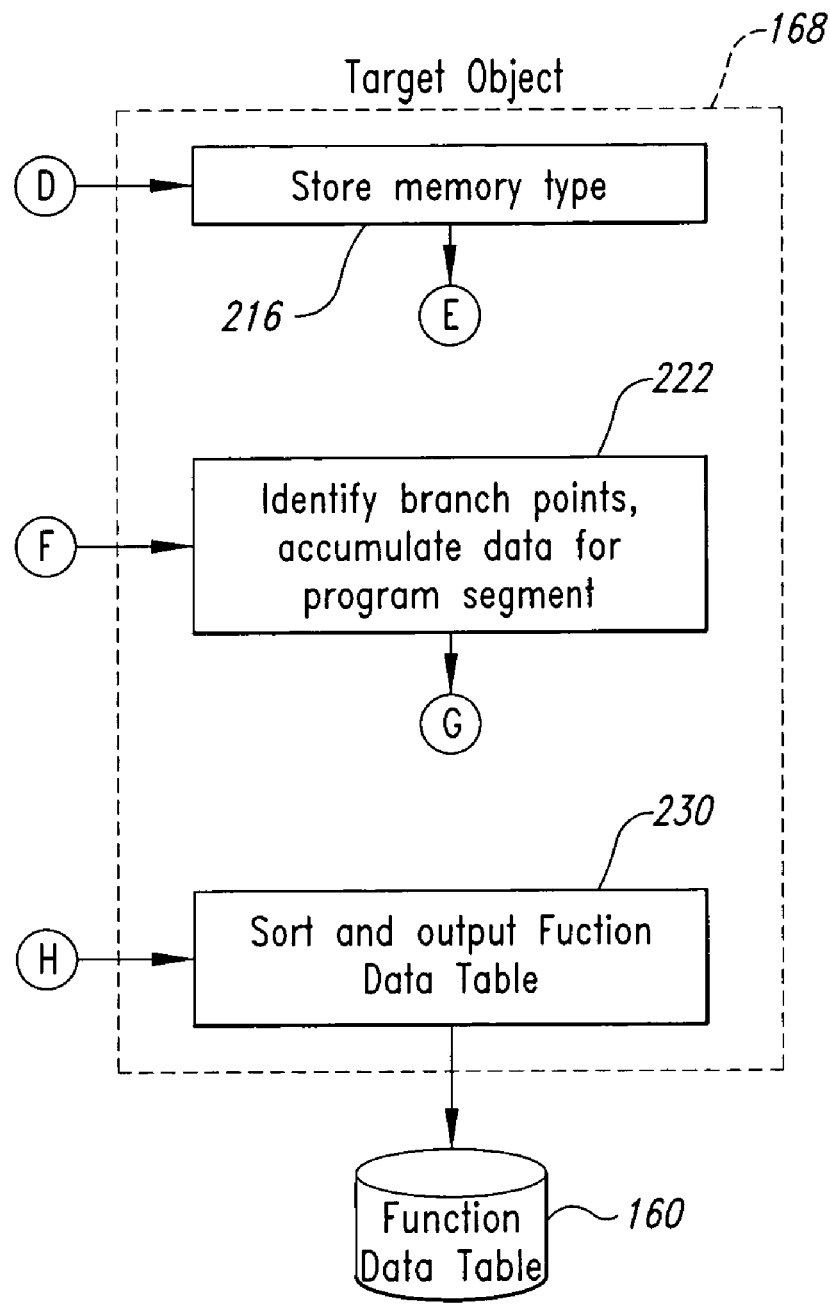

Shown in FIGS. 4A–C is an embodiment of an assembly analyzer 150 that may be substituted for the assembly analyzer 24 of FIG. 1. The software developer's instrumented code 18 (FIG. 1) is assembled using the target compiler 20 to generate assembly files 154a–b. The assembly files 154a–b are placed in an assembly directory 156. There may be one or more assembly directories, such as 156a–c, containing the assembly code for the user's program. An optional memory map file 158 lists the assembly files 154a–b that describe code which will be placed in memory other than instruction-cached RAM, which is the default memory type. For example, some assembly files may contain initialization code which will be stored in FLASH memory (not shown). In one embodiment, the syntax for the optional memory map file 158 is:

```
statement:
    comment
    memory_declaration
    comment:
        // [comment_string] \n
```

```
                    -continued
            memory_declaration:
                memory_type  : \n
                memory_declaration file_list \n
            memory_type:
                RAM
                RAM_no_cache
                FLASH
                FLASH_no_cache
                AUX1
                AUX1_no_cache
                AUX2
                AUX2_no_cache
            file_list:
                file_name
                file_name <W/S> file_list
```

As mentioned previously, a function data table 160 is produced by the assembly analyzer 150. The function data table 160 contains the names of the function and a table with one line of data for every branch of each of the functions analyzed. In one embodiment, the format of the function data table 160 is:

```
// SIZE OF FUNCTION NAME LIST IS
< length of function name list >
// FUNCTION NAME LIST BEGINS HERE
< function name >
.
.
.
// FUNCTION NAME LIST ENDS HERE
// TAG DATA TABLE BEGINS HERE
   <tag number> \t <function name> \t <# of instructions> \t <# of data accesses>
   \t <# of CPU cycles> \t <stack size> \t <predicted branch> \t <memory type>
.
.
.
// TAG DATA TABLE ENDS HERE
```

A main program 164 shown in FIG. 4A is responsible for constructing a compiler object 166 and a target object 168, routing the assembly files 154a–b to the compiler and target objects, 166 and 168, respectively, and producing the resulting function data table 160. The compiler object 166 is responsible for parsing the assembly files 154a–b and passing the individual instructions to the target object 168. There is typically a different type of compiler object (e.g., derived class) 166 for each compiler family supported. A new class derived from the base class compiler should be written, however, no other significant changes to the program will be required in order to support an additional processor type. The target object 168 is responsible for interpreting the execution flow of individual instructions of the assembly files 154a–b, accumulating the execution time description for each code segment, and writing out the function data table 160. There are different types of target objects (e.g., derived class) 168 for each processor or processor family supported. To support an additional processor type, a new class derived from the base class target may need to be written. However, no other significant changes to the program will be required.

The flow chart shown in FIGS. 4A–C further illustrates the relationship between the various elements previously mentioned. The software developer invokes the assembly file analyzer 150, possibly through a shell script or similar process automation (step 200). The analyzer 150 may be invoked with the following command line options:

d—The directory in which files are to be found. More than one directory can be specified; the default is the current directory. If a directory is specified, it replaces the default (current) directory.

e—The file extension to analyze. More than one extension can be specified; the default extension is .s.

m—The memory map file name. Only one can be specified; the default is no map file.

c—The compiler which was the source of the assembly file. Only one can be specified; the default compiler is gnu.

t—The target architecture for the assembly files. Only one can be specified; the default architecture is sparc.

o—The output file name for the completed tag data table. Only one can be specified; the default is tagdata.tbl.

Once invoked, the main program 164 interprets the command line arguments to obtain a list of assembly directories 156a–c, an extension for the assembly files 154a–b, a memory map file 158, a compiler type, a target type, and a filename for the function data table 160 (step 202). The main program 164 then constructs the target object 168 (step 204) and the compiler object 166 (step 206), and provides a pointer to the target object as one of the arguments to the constructor for the compiler object. The main program 164 further obtains a directory for the assembly directory 156 (step 208) and searches the directory for an assembly file 154 with the specified file extension (step 210). The name of the assembly file 154 is supplied to the compiler object 166. The main program 164 searches the memory map file 158 for the name of the assembly file 154 to be processed (step 212). If the main program 164 finds the name, it sends the memory type to the target object 168 (steps 214–216).

At this time, the compiler object 166 opens the assembly file 154 (step 218) and identifies individual instructions (step 220). The op-code, operands, and most recent label are sent to the target object 168. The target object 168 identifies the beginning and end of the individual code segments of the assembly file 154 and accumulates the execution time data for each such segment until the end of the file is reached. A list of function names from the instruction labels is also accumulated by the target object 168 (steps 220–224).

Steps 210 through 224 are repeated for each assembly file 154 in the assembly directory 156 (step 226). Similarly, steps 208 through 226 are repeated for each assembly directory 156 in the list of assembly directories (step 228). After completing the list of assembly directories, the main program 164 provides the name for the function data table 160 to the target object 168. The target object 168 sorts the list of function names into alphabetical order, outputs the list of function names to the function data table 160, and sorts the function data table 160 in order of ascending tag number (step 230). The function data table 160 is provided by the target object 168 upon completion.

Figure 5:
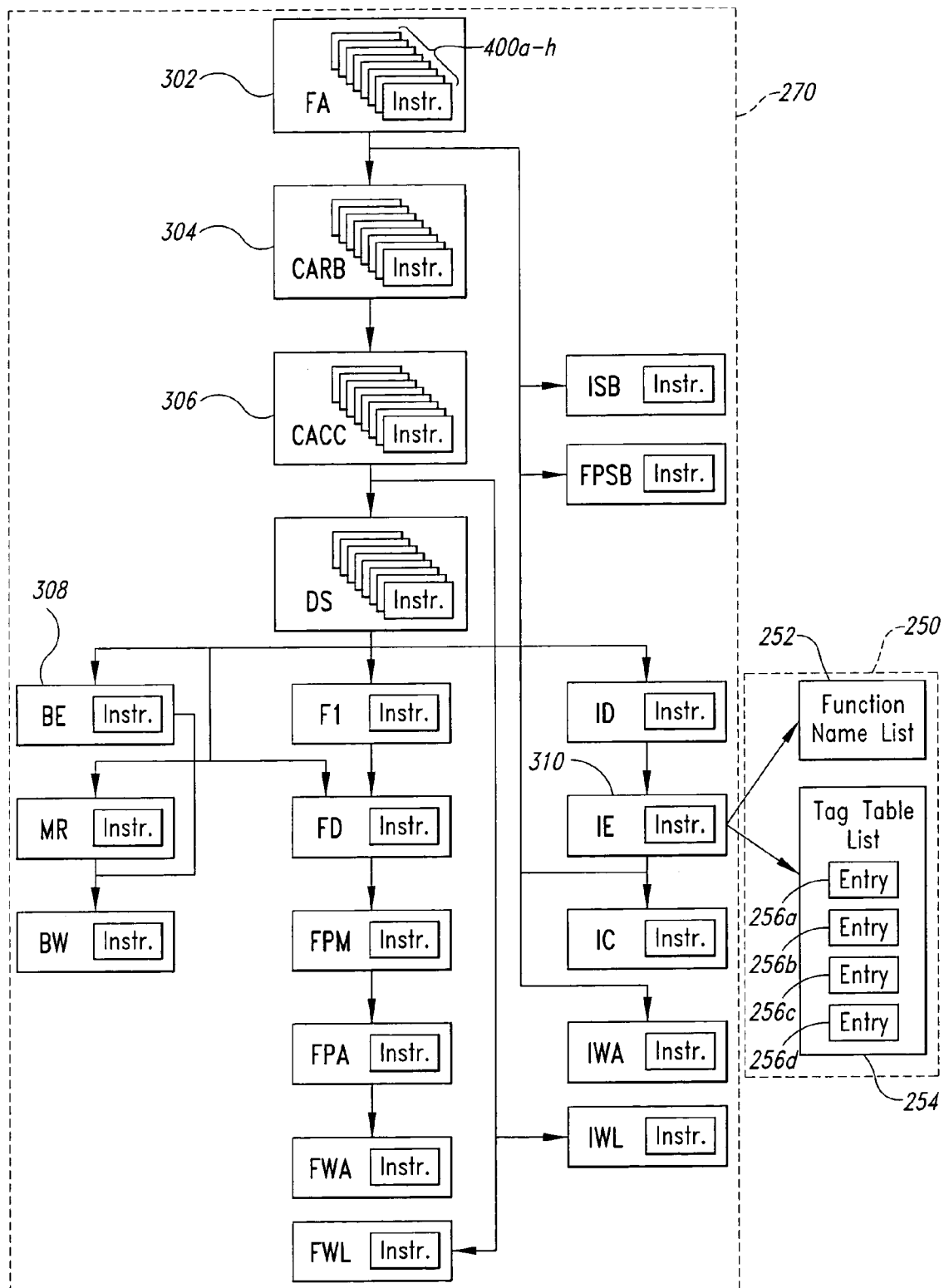
FIG. 5 is an embodiment of a target object that may be used in the assembly analyzer of FIG. 4C.

An embodiment of a target object 250 that may be substituted for the target object 168 of FIG. 4C is illustrated in FIG. 5. The target object 250 represents an instruction set and architecture for the Motorola/IBM Power PC family of processors in general, and specifically the Motorola PPC 601. However, it will be appreciated that the selection of the specific target processor is made for the sake of providing an example, and should not be interpreted as limiting the scope of the invention. As mentioned previously, there is typically a different type of target object for each target processor or processor family.

As explained above, the target object 250 generally performs two functions. First, a stream of instructions is analyzed to identify program code segments, accumulate a set of execution parameters for each code segment, and accumulate a list of function names. As mentioned previously, the program developer's source code 14 is broken down into code segments that are defined by tags inserted by the instrumenter 16 (FIG. 1). Second, the list of function names and code segment execution parameters is output by the target object 250. The target object 250 maintains a function name list 252 of the function names that have been encountered. A tag table list 254 of accumulated tag table entries 256*a–d* is also maintained by the target object 250. Each tag table entry 256*a–d* represents a data structure describing the execution parameters for an individual code segment.

FIG. 5 further includes a logical block diagram of a CPU instruction pipeline 270 for a Motorola PPC 601 processor in order to illustrate the overall relationship between the target object 250 and the CPU instruction pipeline 270. The CPU instruction pipeline includes several CPU stages, such as Fetch Arbitration (FA) and Cache Arbitration (CARB) CPU stages, 302 and 304, respectively. Each CPU stage represents an execution stage in one of the pipelines of the target processor. Each stage can contain name and instruction information. The CPU stages also have a processing function which takes the instruction's op code as an argument. For example, the Integer Execution (IE) CPU stage 310 counts the number of CPU cycles consumed by a code segment, starting with the first non-null instruction it executes in the segment and ending when it processes the first instruction for the next code segment. The Cache Access (CACC)CPU stage 306 counts the number of data accesses in a given code segment. The Branch Execute (BE) CPU stage 308 is responsible for determining the predicted branch tag. It does so by storing the label for the predicted branch. The label will be used later as an index to the corresponding tag number. The stages are arranged in FIG. 5 in the same dependency order as they are in the target processor.

Figure 6:
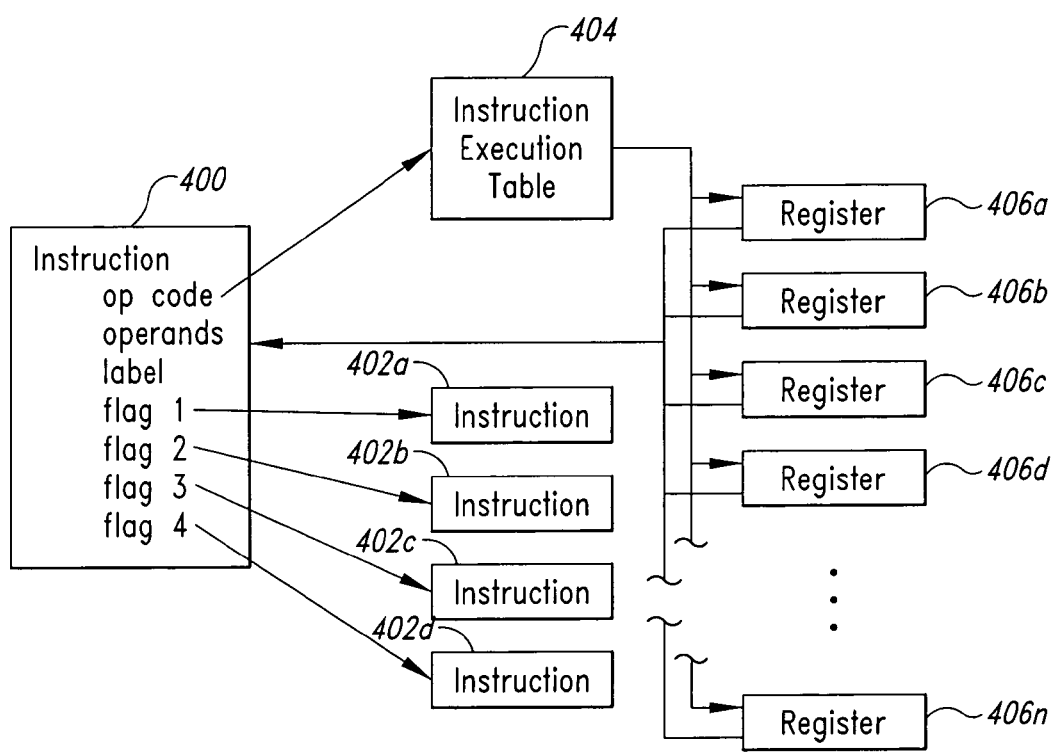
FIG. 6 is a block diagram of an instruction object of a code segment.

FIG. 6 illustrates the relationship between an instruction 400 and its surroundings in the target processor. The instruction 400 typically includes an op code, operands, and label. It also has pointers to four other instruction objects 402*a–d*. These pointers can be used as execution synchronization tags required by the superscalar architecture of the PPC 601. From its op code, the instruction 400 can locate its associated execution table 404. The execution table 404 describes the execution sequence of an instruction and the prerequisites for each execution stage in a tabulated format. Registers 406*a–n* receive information from the instruction execution table 404 and provide data to the instruction 400. The registers 406*a–n* may be either a general or special purpose registers in the target processor. 406*a–n* may be either general or special purpose registers in the target processor. Each of the registers 406*a–n* knows whether an instruction is making exclusive use of it, whether or not its contents have been defined and, if defined, what value it contains.

In operation, instructions 400 are read into the FA and CARB stages 302 and 304 until eight instructions 400*a–h* are present in the FA/CARB stages. Starting from the end of the CPU instruction pipeline 270, each CPU stage is given the opportunity to update its contents. This process will typically involve determining whether it has completed processing the current instruction and, if it has, requesting the next instruction from the preceding CPU stage. The requested instruction 400 uses its instruction execution table 404 to determine whether the resources are available to move to the next CPU stage. If the required resources are available, the instruction 400 moves to the requesting CPU stage, which immediately processes its instruction(s), thus making the result available for any applicable feed-forward operations. The FA and CARB stages 302 and 304 are the last stages to be updated. This, in effect, returns execution to the beginning. The FA/CARB keeps a record of all the instructions it has processed for a given code segment, thus making those instructions available in case there is an inline loop in the segment. The FA is responsible for counting the number of instructions in a code segment.

Although the software developer's source code has been described as being separated into code segments, it is more precise to state that the source code is separated into functions, and each function can be separated into one or more code segments. When instrumented with coverage tags, a function will contain a function entry tag, at least one function exit tag, and a branch tag for every branch point in the function. The segmentation of the code is performed in such a way that there is a unique code segment associated with each tag. The algorithm which assigns code segments to tags must therefore take function entry and exit into account. The first code segment in a function extends from the beginning of the function to the second call to the tag function. Subsequent code segments begin with the call to the tag function, and end either at the next call to the tag function, or else at the very end of the function. Detecting the beginning of the function is also useful in that it makes the function name available when displaying the contents of instruction cache.

A function begins either when the first instruction or tagged bubble reaches the IE stage 310 or on the cycle after the tag for a blr or rfi instruction completes in the IE. When a new function begins, the label on the first instruction in the function is assumed to be the function name. The IE stage searches the function name list to see if the new label is on the list. If it is, the IE issues a warning message and continues processing. Otherwise, it adds the new label to the function name list. The IE stage subtracts 8 from the constant portion of the second operand in the stwu instruction and then divides by four to get the number of words of stack data.

A new segment begins either at the beginning of a function (as above) or, if not at the beginning of a function, on the cycle after the tag for a bl instruction to the label ExportTag completes in the IE. When the tag for a bl instruction (branch with return address in the link register) to ExportTag completes in the IE, the IE uses the value in the last register to be loaded with a constant value as the tag number. When a new segment begins, the IE appends a new Tag Table Entry to the Tag Table List. This Tag Table Entry is initialized with the memory type and function name.

A segment ends either when a tag for a blr (branch to link register) or rfi (return from interrupt) instruction completes in the IE or, if not at the beginning of a function, when a tag for a by instruction to the label ExportTag completes in the IE. If at the beginning of a function, the segment ends either when a tag for a blr or rfi instruction completes in the IE or when the second tag for a bl instruction to the label ExportTag completes in the IE. In other words, the first segment of a function contains the first branch to ExportTag, and gets its segment number from that call to ExportTag. All other segments get their segment number from the call to ExportTag which precedes them.

There will be cases in which the source level instrumentation does not detect when a loop will be inserted in the target assembly code. These "in-line" loops will occur, for example when an assignment is made to a large struct, causing all the bytes in the struct to be copied from the source to the destination. These loops will always iterate a constant number of cycles, and can therefore be accurately included inside a program segment.

During normal operation, the IE maintains a list of all of the labels it has encountered since the beginning of the program segment, and the number of CPU cycles since each label was first encountered. The BE stage detects when a conditional branch is already resolved (for example by having a defined value in the counter (CTR) register). The BE stage then sends the instruction identity, the branch label and number of loop iterations to the IE stage. The IE stage waits until it detects the branch tag for the loop branching instruction. When it detects the branch tag, the IE stage looks for the loop label in its list of labels. If the label is found, the IE calculates the number of additional CPU cycles consumed by the internal loop:

(number of cycles since label)*(number of loop iterations)+(pipeline latency to IE−1)*(number of loops iterations−1)

This calculation takes into account that fact that the fetching of loop instructions starts one CPU cycle before the branch tag gets to the IE, and the fact that the loop instructions will not have to be fetched for the first loop iteration and the continued execution past the loop. The IE stage adds the CPU cycle increment to the execution time for each of the labels. Performing the calculation in this way allows nested inlined loops to be supported.

When a segment ends, the IE stage creates a function data table entry for the predicted branch for any branch tags which were not resolved within the program segment, and a function data table entry with a null (default) predicted branch tag. For each such function data table entry, the number of CPU cycles is taken from the IE stage, the number of data accesses is taken from the CACC stage, the number of instructions is taken from the FA stage, and the predicted branch tag is taken from the BE stage. The number of CPU cycles is decreased by two to account for the instructions needed to load the tag number, and the number of instructions is decreased by three to account for the instructions used to call ExportTag.

Alternatively, a code segment may be viewed conceptually as being either a branch segment or a function. A function is generally a sequence of instructions that does return to the branch call when the sequence is finished. A branch segment, on the other hand, is generally a sequence of instructions that does not return from where the branch segment was initially called when the sequence is completed.

A function begins either when the first instruction or tagged bubble reaches the IE stage 310 or on the cycle after the tag for a conditional branch-return (blr) instruction completes in the IE stage 310. When a new function begins, the label on the first instruction in the function is assumed to be the function name. The IE stage 310 searches the function name list 252 to see if the new label is on the list. If it is, the IE stage 310 issues a warning message and continues processing. Otherwise, it adds the new label to the function name list 252. The IE stage 310 subtracts 8 from the constant portion of the second operand in the stwu instruction and then divides by four to get the number of words of stack data.

A new branch segment begins either at the beginning of a function, as previously described, or on the cycle after the tag for a conditional branch (bl) instruction to the label ExportTag completes in the IE stage 310. When the tag for a bl instruction to ExportTag completes in the IE stage 310, the IE stage 310 uses the value in the last register to be loaded with a constant value as the tag number. When a new segment begins, the IE stage 310 appends a new tag table entry 256 to the tag table list 254. The tag table entry 256 is initialized with the memory type and segment name.

The function and branch segment ends either when a tag for a blr instruction or a tag for a bl instruction to the label ExportTag completes in the IE stage 310. When a segment ends, the number of CPU cycles is taken from the IE stage 310, the number of data accesses is taken from the CACC stage 306, the number of instructions is taken from the FA stage 302, and the predicted branch tag is taken from the BE stage 308. The number of CPU cycles is decreased by two to account for the instructions needed to load the tag number, and the number of instructions is decreased by three to account for the instructions used to call ExportTag.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for simulating the execution of a software program on a simulated hardware system at least partially defined by hardware parameters, the method comprising:
   estimating execution times for program segments of the software program based on software parameters describing the program segment and the hardware parameters in response to a host system executing the respective program segments, one or more of the program segments being bounded by branchpoints; and
   summing together the estimated execution times of the program segments executed by the host system to provide a simulated execution time of the software program on the simulated hardware system.

2. The method of claim 1 wherein the program segments are delineated by coverage tags instrumented in the software program.

3. The method of claim 2, further comprising:
   dividing the software program into program segments;
   determining the software parameters for each program segment; and
   tabulating the software parameters for each program segment into a table indexed by a respective coverage tag.

4. The method of claim 3 wherein determining the software parameters comprises:
   determining the number of CPU cycles for a program segment;
   determining the number of data accesses for the program segment; and
   determining the number of instructions for the program segment.

5. The method of claim 2 wherein estimating execution times comprises:
   detecting execution of a coverage tag by the host system;
   obtaining from a function data table the software parameters indexed under a tag value returned by the executed coverage tag in response to executing the coverage tag;
   obtaining from a hardware configuration table the hardware parameters of the simulated hardware system; and calculating an estimated program segment execution time based on the data obtained from the function data table and the hardware configuration table.

6. The method of claim 5 wherein calculating the estimated program segment execution time comprises:
   calculating an estimated time for the simulated processor to execute instructions of the program segment;
   calculating an estimated time for instructions to be made available to the simulated processor for execution;
   calculating an estimated time for data requested by the instructions of the program segment to be made available to the simulated processor; and
   summing together the estimated times.

7. The method of claim 6 wherein calculating the estimated time for the simulated processor to execute instructions of the program segment comprises:
   obtaining from the function data table and hardware configuration file a number of processor cycles for the program segment and a processor cycle period for a simulated processor of the simulated hardware system; and
   multiplying the number of processor cycles with the processor cycle period.

8. A method for simulating the execution of a software program on a simulated hardware system at least partially defined by hardware parameters, the method comprising:
   delineating program segments of the software program with coverage tags;
   detecting execution of a coverage tag by the host system;
   obtaining from a function data table a number of instructions for a program segment wherein the function data table is indexed under a tag value returned by the executed coverage tag in response to executing the coverage tag;
   obtaining from a hardware configuration table containing hardware parameters of the simulated hardware system a size of a first cache, a size of a second cache, an access time per instruction for the second cache, a bus cycle time, and a program memory wait state; and
   resolving the equation:

$$t_{instruction}=((N_{L1}-N_{L2})*(t_{L2}-t_{L2}-t_{cpu}))+(N_{L2}*(t_{bus}*(N_{cach}+N_{pgm\_store})C_{cache}-t_{cpu})$$

where $t_{instruction}$ is an instruction access time, $N_{L1}$ is the size of the first cache, $N_{L2}$ is the size of the second cache, $t_{L2}$ is the access time per instruction for the second cache, $t_{cpu}$ is a CPU cycle time, $t_{bus}$ is the bus cycle time, $N_{cache}$ is a cache line bus cycles, $N_{pgm\_store}$ is the program memory wait state, and $C_{cache}$ is a cache line size.

9. A method for simulating the execution of a software program on a simulated hardware system at least partially defined by hardware parameters, the method comprising:
   delineating program segments of the software program with coverage tags;
   detecting execution of a coverage tag by the host system;
   obtaining from a function data table a stack data size for a program segment, wherein the function data table is indexed under a tag value returned by the executed coverage tag in response to executing the coverage tag;
   obtaining from a hardware configuration table containing hardware parameters of the simulated hardware system a size of a data cache, a bus cycle time, a data memory wait states, an average size of data beat, and a volatile memory wait state; and
   resolving the equation:

$$t_{data}=numberOfDataAccesses*t_{bus}*(N_{cache}+N_{data\_store})/C_{cache}$$

where $t_{data}$ is a data access time, numberOfDataAccesses is a number of data accesses, $t_{bus}$ is the bus cycle time, $N_{cache}$ a cache line bus cycles, $N_{data\_store}$ is the data memory wait states, $C_{cache}$ is a cache line size.

10. The method of claim 1, further comprising:
    maintaining an image of an instruction cache of the simulated hardware system indicative of the contents of the instruction cache; and
    updating the image of the instruction cache following the execution of each program segment on the host system.

11. The method of claim 10, further comprising displaying the simulated execution time of the software program and the image of the instruction cache.

12. A method of estimating an execution time of a software program instrumented with coverage tags on a simulated hardware system at least partially defined by hardware parameters, the coverage tags delineating program segments of the software program, the method comprising:
    tabulating the hardware parameters in a hardware configuration file and software parameters describing the program segments of the software program in a function data table, one or more of the program segments being greater than one instruction byte in length;
    executing the software program;
    detecting execution of a coverage tag;
    obtaining hardware parameters from the hardware configuration file and obtaining from the function data table the software parameters for the program segment corresponding to the executed coverage tag;
    calculating an estimated program segment execution time for the program segment corresponding to the executed coverage tag based on the obtained hardware and software parameters; and
    adding the estimated program segment execution time to a running total for the total execution time of the software program.

13. The method of claim 12 wherein calculating the estimated program segment execution time comprises:
    calculating an estimated time for the simulated processor to execute instructions of the program segment;
    calculating an estimated time for instructions to be made available to the simulated processor for execution;
    calculating an estimated time for data requested by the instructions of the program segment to be made available to the simulated processor; and
    summing together the estimated times.

14. The method of claim 13 wherein calculating the estimated time for the simulated processor to execute instructions of the program segment comprises:
    obtaining from the function data table and hardware configuration file a number of processor cycles for the program segment and a processor cycle period for a simulated processor of the simulated hardware system; and
    multiplying the number of processor cycles with the processor cycle period.

15. The method of claim 13 wherein calculating the estimated time for instructions to be made available comprises:
    obtaining from the function data table and hardware configuration file a number of instructions for the program segment, size of a first cache, size of a second cache, an access time per instruction for the second cache, a bus cycle time, and a program memory wait state; and resolving an equation using this data to obtain an instruction access time.

16. The method of claim 12, further comprising:

maintaining an image of an instruction cache of the simulated hardware system indicative of the contents of the instruction cache; and updating the image of the instruction cache following the execution of each program segment.

17. The method of claim 16, further comprising displaying the simulated execution time of the software program and the image of the instruction cache.

18. The method of claim 12 wherein tabulating the software parameters in the function data table comprises:

dividing the software program into program segments;

determining software parameters for each program segment; and tabulating the software parameters for each program segment into a table indexed by a respective coverage tag.

19. The method of claim 18 wherein determining the software parameters comprises:

determining the number of CPU cycles for a program segment;

determining the number of data accesses for the program segment; and determining the number of instructions for the program segment.

20. A system for analyzing a simulated execution of a software program on a simulated hardware system at least partially defined by hardware parameters, the software program instrumented with executable coverage tags delineating program segments of the software program, one or more of the program segments being greater than one instruction byte in length, the system comprising:

a memory to store software parameters describing the program segments of the software program and the hardware parameters; and a processor coupled to the memory to execute the software program and to calculate the estimated execution time for a program segment based on the software and hardware parameters in response to executing the respective coverage tag, the processor adding the estimated execution time to a running total of the total estimated execution time for the software program.

21. The system of claim 20, further comprising an assembly analyzer to tabulate the software parameters, the assembly analyzer:

dividing the software program into program segments;

determining software parameters for each program segment; and tabulating the software parameters for each program segment into a table indexed by a respective coverage tag.

22. The system of claim 21 wherein determining the software parameters comprises:

determining the number of CPU cycles for a program segment;

determining the number of data accesses for the program segment; and determining the number of instructions for the program segment.

23. The system of claim 20 wherein the memory is further adapted to store instruction cache data reflecting the contents of an instruction cache of a simulated central processing unit of the simulated hardware system, and the processor further maintaining an instruction cache image by updating the instruction cache data when a program segment is executed.

24. The system of claim 20 wherein the processor calculates the execution time by:

detecting execution of a coverage tag by the host system;

obtaining from a function data table the software parameters indexed under a tag value returned by the executed coverage tag in response to executing the coverage tag;

obtaining from a hardware configuration table the hardware parameters of the simulated hardware system; and calculating an estimated program segment execution time based on the data obtained from the function data table and the hardware configuration table.

25. The system of claim 24 wherein the processor calculates the estimated program segment execution time by:

calculating an estimated time for the simulated processor to execute instructions of the program segment;

calculating an estimated time for instructions to be made available to the simulated processor for execution;

calculating an estimated time for data requested by the instructions of the program segment to be made available to the simulated processor; and summing together the estimated times.

26. The system of claim 25 wherein the processor calculates the estimated time for the simulated processor to execute instructions of the program segment by:

obtaining from the function data table and hardware configuration file a number of processor cycles for the program segment and a processor cycle period for a simulated processor of the simulated hardware system; and multiplying the number of processor cycles with the processor cycle period.

27. A system for analyzing a simulated execution of a target software program on a simulated hardware system at least partially defined by hardware parameters, the system comprising:

a memory to store a function data table tabulating software parameters describing program segments of the target software program, one or more of the program segments being greater than one instruction byte in length, the memory further to store a hardware configuration file tabulating the hardware parameters; and a processor coupled to the memory to execute the target software program and to calculate an estimated execution time of the target software program on the simulated hardware system, the processor calculating the estimated execution time by:

estimating execution times for the program segments of the target software program based on the software parameters and the hardware parameters in response to the processor executing the respective program segments; and summing together the estimated execution times of the program segments executed by the processor to provide the estimated execution time of the target software program on the simulated hardware system.

28. The system of claim 27 wherein the memory is further adapted to store instruction cache data reflecting the contents of an instruction cache of a simulated central processing unit of the simulated hardware system, and the processor further maintaining an instruction cache image by updating the instruction cache data when a program segment is executed.

29. The system of claim 28, further including a display coupled to the processor to display the total estimated execution time of the software program and the instruction cache image.

30. The system of claim 27 wherein the processor estimates the execution time by:
  detecting execution of a coverage tag by the host system;
  obtaining from a function data table the software parameters indexed under a tag value returned by the executed coverage tag in response to executing the coverage tag;
  obtaining from a hardware configuration table the hardware parameters of the simulated hardware system; and
  calculating an estimated program segment execution time based on the data obtained from the function data table and the hardware configuration table.

31. The system of claim 30 wherein the processor calculates the estimated program segment execution time by:
  calculating an estimated time for the simulated processor to execute instructions of the program segment;
  calculating an estimated time for instructions to be made available to the simulated processor for execution;
  calculating an estimated time for data requested by the instructions of the program segment to be made available to the simulated processor; and
  summing together the estimated times.

32. The system of claim 31 wherein the processor calculates the estimated time for the simulated processor to execute instructions of the program segment by:
  obtaining from the function data table and hardware configuration file a number of processor cycles for the program segment and a processor cycle period for a simulated processor of the simulated hardware system; and
  multiplying the number of processor cycles with the processor cycle period.

33. A method of producing a simulated execution time of a software program on a simulated hardware system or a simulated hardware and software system, the method comprising the steps:
  executing, for each program segment, an executable coverage tag instrumented into the software program in addition to the simulated software program instructions, the tag comprising a function call to a tag function and a reference to a function data table, the reference being more than one bit in length, the executable coverage tag being at least a byte in length;
  looking up parameter data for the respective program segment in the function data table;
  calculating, for each program segment, an estimated execution time based on the parameter data for each program segment and;
  summing together the estimated execution times of the program segments executed by the host system to provide a simulated execution time of the software program on the simulated hardware system.

34. A method for simulating the execution of a software program on a simulated hardware system at least partially defined by hardware parameters, the method comprising:
  dividing the software program into program segments, one or more of the program segments being greater than one instruction byte in length;
  tabulating the software parameters for each program segment into a table and indexing the table to a plurality of respective executable coverage tags;
  instrumenting each executable coverage tag into the software program before execution;
  executing the software program and the instrumented executable coverage tags.

35. A method for simulating the execution of a software program on a simulated hardware system at least partially defined by hardware parameters, the method comprising:
  dividing the software program into program segments, one or more of the program segments being greater than one instruction byte in length;
  tabulating the software parameters for each program segment into a table and indexing the table to a plurality of respective coverage tags;
  instrumenting each coverage tag into the respective software program segment before execution;
  executing the software program and those coverage tags encountered during execution.

36. A method for simulating the execution of a software program on a simulated hardware system at least partially defined by hardware parameters, the method comprising:
  dividing the software program into program segments;
  tabulating the software parameters for each program segment into a table and indexing the table to a plurality of respective executable coverage tags, the coverage tags each having a function call to a tag function and a tag number for provision to the tag function, the tag function keeping a running total of the total execution time;
  instrumenting each coverage tag into the respective program;
  executing the software program and those coverage tags encountered during execution.

* * * * *